US012459285B2

(12) United States Patent
Takagi

(10) Patent No.: US 12,459,285 B2
(45) Date of Patent: Nov. 4, 2025

(54) BOOKLET PRODUCTION APPARATUS AND IMAGE FORMING SYSTEM

(71) Applicant: CANON KABUSHIKI KAISHA, Tokyo (JP)

(72) Inventor: Kenji Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/906,024

(22) Filed: Oct. 3, 2024

(65) Prior Publication Data

US 2025/0121623 A1 Apr. 17, 2025

(51) Int. Cl.

*B42C 3/00* (2006.01)
*B42C 9/00* (2006.01)
*G03G 15/00* (2006.01)

(52) U.S. Cl.

CPC .............. *B42C 3/00* (2013.01); *B42C 9/0081* (2013.01); *G03G 15/6544* (2013.01); *G03G 15/6585* (2013.01); *G03G 2215/00835* (2013.01)

(58) Field of Classification Search

CPC .... B42C 3/00; B42C 9/0081; G03G 15/6544; G03G 15/6585; G03G 2215/00835

See application file for complete search history.

(56) References Cited

U.S. PATENT DOCUMENTS

| | | | | |
|---|---|---|---|---|
| 2012/0155944 | A1 | 6/2012 | Matsue et al. | |
| 2020/0338825 | A1* | 10/2020 | Comb | B33Y 30/00 |
| 2025/0004392 | A1* | 1/2025 | Usui | G03G 15/0126 |
| 2025/0170848 | A1* | 5/2025 | Takagi | B42C 13/00 |

FOREIGN PATENT DOCUMENTS

| | | | |
|---|---|---|---|
| JP | H0920448 | A | 1/1997 |
| JP | 2005007637 | A | 1/2005 |
| JP | 2005162352 | A | 6/2005 |
| JP | 2010111025 | A | 5/2010 |
| JP | 2014237291 | A | 12/2014 |
| JP | 2015196567 | A | 11/2015 |

* cited by examiner

*Primary Examiner* — David H Banh

(74) *Attorney, Agent, or Firm* — Canon U.S.A., Inc., IP Division

(57) ABSTRACT

In a case where a region of a heating pressurization unit in a longitudinal direction of the heating pressurization unit where the heating pressurization unit heats and pressurizes a sheet of a maximum size is a first region, and a region of the heating pressurization unit in the longitudinal direction where the heating pressurization unit heats and pressurizes a sheet of a minimum size is a second region, and a region of the heating pressurization unit inside the first region and outside the second region in the longitudinal direction is a third region, the heating pressurization unit heats and pressurizes the sheet of the maximum size with a pressurization force profile having a minimum value in the longitudinal direction at a position in the third region or a position of an end portion of the second region adjacent to the third region.

9 Claims, 27 Drawing Sheets

BOOKLET PRODUCTION APPARATUS AND IMAGE FORMING SYSTEM

BACKGROUND OF THE INVENTION

Field of the Invention

The present invention relates to a booklet production apparatus that produces a booklet by bonding a plurality of recording materials, and an image forming system including the booklet production apparatus.

Description of the Related Art

As discussed in Japanese Patent Application Laid-Open No. 2010-111025, a method for producing a booklet by, in a bundle of sheets composed of a plurality of sheets subjected to an image forming process by an image forming apparatus such as a printer or a copying machine, causing a booklet production apparatus to remelt adhesion toner and perform a bonding process on the sheets is known.

In a case where an image forming apparatus and a booklet production apparatus are made compatible with a plurality of sheet sizes, it is necessary to configure a thermocompression bonding method of the booklet production apparatus to heat and pressurize the maximum sheet size (large-size sheets). In a heating pressurization unit that makes the pressurization force distribution in the longitudinal direction of the heating pressurization unit uniform when pressurizing the large-size sheets, when the heating pressurization unit pressurizes a sheet size (small-size sheets) smaller than the large-size sheets, the pressurization force concentrates on end portions of the small-size sheets. As a result, the pressurization force may decrease in portions other than the end portions of the small-size sheets.

The present invention is directed to providing a booklet production apparatus and an image forming system that, regarding a plurality of sheet sizes, make the pressurization force distribution of a pressurization force applied to sheets in the longitudinal direction of a heating pressurization unit appropriate.

SUMMARY OF THE INVENTION

According to an aspect of the present invention, a booklet production apparatus includes an elongate heating pressurization unit configured to, in a state where a plurality of sheets in which adhesive layers are formed is piled up, heat and pressurize the adhesive layers, the heating pressurization unit including a pressurization plate configured to come into contact with the sheets and pressurize the sheets, a heating member configured to heat the pressurization plate, a reception member opposed to the pressurization plate, and a pressurization mechanism configured to apply a pressure to the sheets nipped between the pressurization plate and the reception member, wherein the booklet production apparatus is configured to produce a booklet by, while nipping the plurality of sheets in which the adhesive layers are formed between the pressurization plate and the reception member, heating and pressurizing the adhesive layer formed in the sheets, and wherein in a case where a region of the heating pressurization unit in a longitudinal direction of the heating pressurization unit where the heating pressurization unit heats and pressurizes a sheet of a maximum size is a first region, and a region of the heating pressurization unit in the longitudinal direction where the heating pressurization unit heats and pressurizes a sheet of a minimum size is a second region, and a region of the heating pressurization unit inside the first region and outside the second region in the longitudinal direction is a third region, the heating pressurization unit heats and pressurizes the sheet of the maximum size with a pressurization force profile having a minimum value in the longitudinal direction at a position in the third region or a position of an end portion of the second region adjacent to the third region, and a region where the pressure greater than the minimum value is applied is present in the third region and on a side opposite to a side where the second region is present with respect to the position of the minimum value in the longitudinal direction.

Further features of the present invention will become apparent from the following description of embodiments with reference to the attached drawings.

DESCRIPTION OF THE EMBODIMENTS

With reference to the drawings, embodiments according to the present invention will be described below. In the present invention, an "image forming apparatus" widely includes an apparatus that forms (records) an image on a recording material (a recording medium), such as a single-function printer, a copying machine, a multifunction peripheral, and a commercial printing machine. A system where an image forming apparatus and a booklet production apparatus that produces a booklet by bonding a plurality of recording materials are joined together is referred to as an "image forming system".

Figure 1:
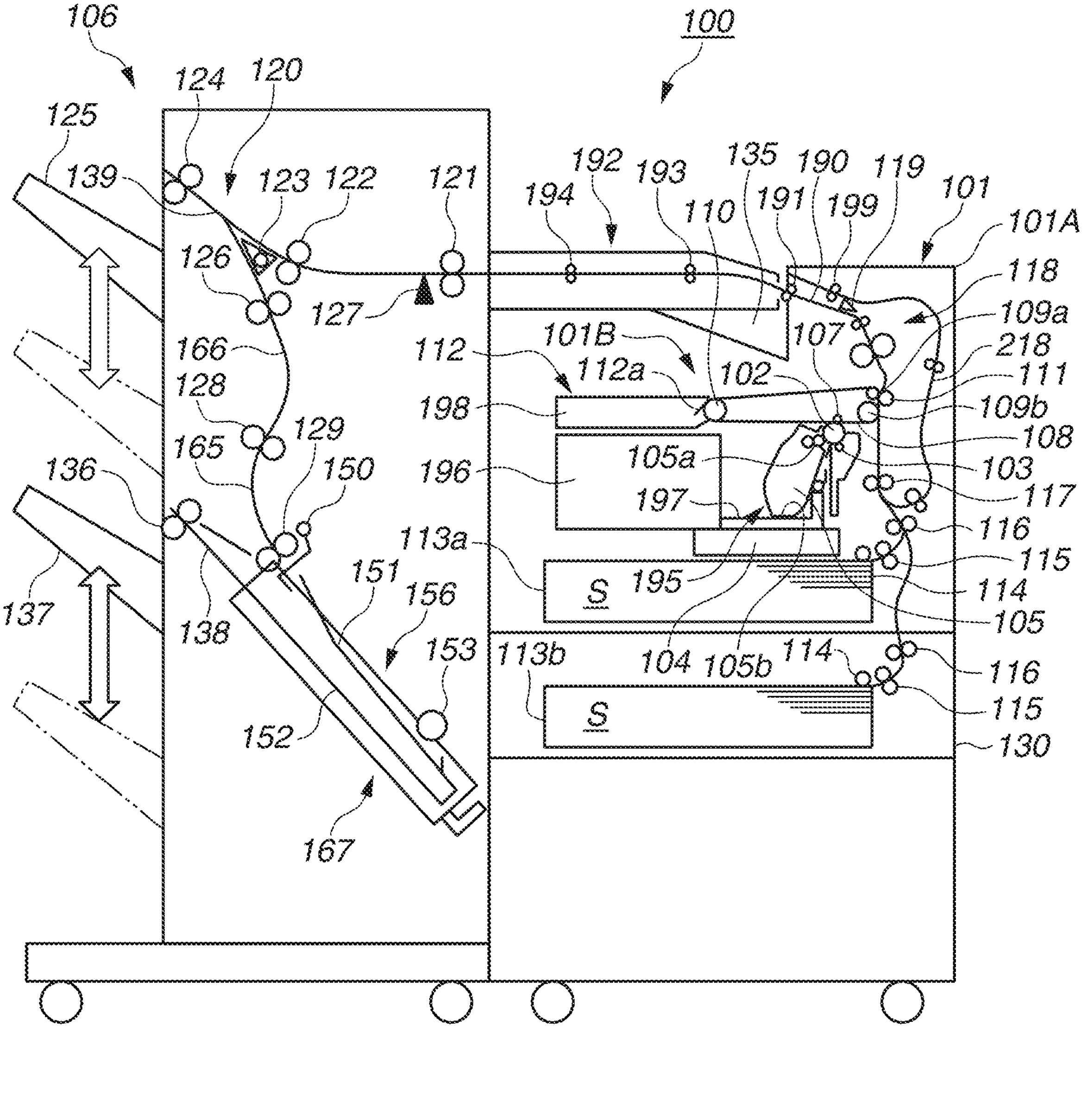
FIG. 1 is a schematic diagram illustrating an image forming apparatus according to a first embodiment.

With reference to FIG. 1 to FIGS. 10A to 10F, the configuration of an image forming apparatus including a sheet material conveyance apparatus according to the present invention is described. The present invention is not limited to the following embodiments, and a certain configuration can be replaced with another configuration in the scope of the idea of the present invention. With reference to FIG. 1, an image forming apparatus and a booklet production apparatus according to a first embodiment are described. FIG. 1 is a schematic diagram illustrating a cross section of an image forming apparatus 101 and a booklet production apparatus 106 according to the first embodiment. An image forming system 100 is formed by combining the image forming apparatus 101 and the booklet production apparatus 106. The image forming system 100 may include a form in which some or all of booklet production functions are incorporated into the image forming apparatus 101.

In the image forming system 100 according to the present embodiment, the image forming apparatus 101 forms an image on each of a plurality of sheets S, and the booklet production apparatus 106 thermocompression-bonds the plurality of sheets S, whereby a single apparatus can create a booklet subjected to printing and bookbinding. As a sheet S, various sheet materials different in size and material such as paper, e.g., plain paper or thick paper, a sheet material subjected to surface treatment, e.g., coated paper, plastic film, cloth, or a sheet material having a special shape, e.g., an envelope or index paper, can be used. In the present embodiment, the conveyance speed of the sheet S is 300 mm/sec. The maximum grammage of the sheet S is 90 g/m$^2$.

(Image Forming Apparatus Main Body)

The image forming apparatus 101 is an electrophotographic apparatus including a housing 101A and an image forming section 101B using an electrophotographic method that is accommodated within the housing 101A. The image forming section 101B is an electrophotographic unit using an intermediate transfer method and includes a primary transfer roller 107, an intermediate transfer belt 108 as an intermediate transfer member, and a process cartridge 195 placed along the intermediate transfer belt 108. The process cartridge 195 includes a photosensitive drum 102 as an image bearing member, a charging device 103 as a charging method, and a development unit 105 as a development method. The image forming section 101B includes a scanner unit 104 as an exposure method. The development unit 105 includes development rollers 105*a* as a development method and a toner container 105*b* that stores toner (a developer). The development rollers 105*a* are rotatably held by the toner container 105*b*.

The process cartridge 195 is attachable to and detachable from the housing 101A. To the image forming apparatus 101, a toner cartridge 196 storing toner to be supplied to the development unit 105 is detachably attached. The "housing 101A" of the image forming apparatus 101 refers to a portion of the image forming apparatus 101 except for the process cartridge 195 and the toner cartridge 196. The housing 101A includes a frame member such as a metal frame forming a frame body of the image forming apparatus 101 and members fixed to the frame body, and forms an attachment space where the process cartridge 195 and the toner cartridge 196 are attached. The process cartridge 195 creates a toner image for recording an image on a sheet S using toner and also creates an adhesion toner image as a powder adhesive for bonding sheets S. The image forming apparatus 101 according to the present embodiment has a monochrome printer configuration for recording a monochrome image. The image forming apparatus 101 uses black toner not only to record an image but also as adhesion toner (an adhesive). Although in the present embodiment, a description has been given of the monochrome printer configuration in which only a single cartridge is mounted and toner is used for both recording and adhesion, the present invention is not limited to this. Alternatively, toner dedicated to adhesion may be used. Yet alternatively, with a configuration in which a plurality of cartridges can be mounted, an image of a plurality of colors may be able to be formed, and a booklet of a plurality of colors may be able to be bonded. At this time, adhesion toner may not be black toner, or may be toner dedicated to adhesion different from toner used to record an image.

The toner cartridge 196 and the process cartridge 195 attached to the housing 101A are connected together through a toner conveyance pipe 197. The toner cartridge 196 can replenish toner to the development unit 105 through the toner conveyance pipe 197. Below the scanner unit 104, a cassette 113*a* (also referred to as a "sheet tray" or a "repository") as a storage portion that stores sheets S used to form images is attached to the housing 101A such that the cassette 113*a* can be pulled out. Further below the housing 101A, one or more optional sheet feeding devices 130 including an additional cassette 113*b* may be joined.

The intermediate transfer belt 108 is an endless belt capable of moving (circling) and stretched around a driving roller 109*a*, a stretching roller 109*b*, and a tension roller 110 that rotate about axes parallel to each other. The intermediate transfer belt 108 is moved (caused to circle) counterclockwise in FIG. 1 by the rotation of the driving roller 109*a*. On the inner peripheral side of the intermediate transfer belt 108, the primary transfer roller 107 as a primary transfer member is placed at a position opposed to the photosensitive drum 102 through the intermediate transfer belt 108. On the outer peripheral side of the intermediate transfer belt 108, a secondary transfer roller 111 as a secondary transfer member is placed at a position opposed to the driving roller 109*a* through the intermediate transfer belt 108. A secondary transfer portion as a nip portion between the intermediate transfer belt 108 and the secondary transfer roller 111 and also as a transfer portion is formed. The intermediate transfer belt 108, the primary transfer roller 107, and the secondary transfer roller 111 are a transfer method for transferring a toner image formed on the photosensitive drum 102 as an image bearing member to a sheet S. At a position opposed to the tension roller 110 through the intermediate transfer belt 108, a belt cleaner 112 as a cleaning method that cleans the intermediate transfer belt 108 is provided. The belt cleaner 112 includes a cleaning member 112*a* such as a blade or a brush placed to abut the intermediate transfer belt 108, and a waste toner container 198 as a collection container. The belt cleaner 112 removes attached substances such as transfer residual toner from the intermediate transfer belt 108 using the cleaning member 112*a* and collects the attached substances in the waste toner container 198. Above the secondary transfer portion in the housing 101A, a fixing device 118 as a fixing method is placed. The fixing device 118 has a configuration using a heat fixing method that fixes a toner image by heating. The fixing device 118 includes a rotating member pair (e.g., a roller pair composed of a fixing roller and a pressure roller) that nips and conveys a sheet S, and a heat source (e.g., a halogen lamp or an induction heating mechanism) that heats a toner image on the sheet S through the fixing roller.

(Image Forming Operation)

In a case where the image forming apparatus 101 executes an image forming operation, a feeding roller 114 as a feeding method feeds sheets S from the cassette 113*a* in a lower portion of the housing 101A or the cassette 113*b* of the sheet feeding device 130. A separation roller pair 115 conveys the fed sheets S while separating the sheets S one by one. Each sheet S is conveyed toward a registration roller pair 117 by pull-out rollers 116, and the front end of the sheet S hits a nip portion of the registration roller pair 117 in a stopped state, whereby the skew of the sheet S is corrected. The registration roller pair 117 sends the sheet S to the secondary transfer portion at a timing synchronized with the progress of a toner image creation process performed by the image forming section 101B.

On the other hand, in the image forming section 101B, the photosensitive drum 102 and the intermediate transfer belt 108 circle. The charging device 103 uniformly charges the surface of the photosensitive drum 102. Based on image information indicating an image to be recorded on the sheet S, the scanner unit 104 emits laser light to the photosensitive drum 102, thereby writing an electrostatic latent image. The electrostatic latent image is developed (visualized) as a black toner image by the development unit 105 developing the electrostatic latent image using black toner. In a case where thermocompression bonding is performed by the booklet production apparatus 106, then based on information indicating the bonding position on the sheet S, the scanner unit 104 emits laser light to the photosensitive drum 102, thereby writing an electrostatic latent image. The electrostatic latent image is developed by the development unit 105 using the black toner. This forms an adhesion toner image in a region on the photosensitive drum 102 corresponding to the bonding position on the sheet S.

The toner image formed on the photosensitive drum 102 is transferred (primarily transferred) to the intermediate transfer belt 108 by the primary transfer roller 107 and conveyed toward the secondary transfer portion by the intermediate transfer belt 108 circling. Then, in the secondary transfer portion, a voltage is applied to the secondary transfer roller 111, whereby the toner image is transferred (secondarily transferred) to the sheet S sent from the registration roller pair 117. The sheet S passing through the secondary transfer portion is sent to the fixing device 118, and the toner image is heated while the sheet S passes through a nip portion between the fixing roller and the pressure roller, whereby the toner softens and then is firmly fixed. This fixes the image to the sheet S.

The conveyance path of the sheet S passing through the fixing device 118 is switched by a switching section 119. In the case of one-sided printing, the sheet S is guided to a discharge path 190 by the switching section 119 and discharged from the housing 101A by a discharge roller pair 191. In the present embodiment, the image forming apparatus 101 is joined to the booklet production apparatus 106 through a relay conveyance unit 192. The sheet S discharged from the discharge roller pair 191 is delivered to the booklet production apparatus 106 through conveyance roller pairs 193 and 194 of the relay conveyance unit 192. In a case where the relay conveyance unit 192 and the booklet production apparatus 106 are not joined to the image forming apparatus 101, the discharge roller pair 191 discharges the sheet S as a final product to a stacking tray 135 provided in an upper portion of the housing 101A. In the case of two-sided printing, the sheet S, on a first surface of which the image is formed, is guided to a reverse roller pair 199 by the switching section 119. Then, the sheet S is subjected to reverse conveyance (switchback conveyance) by the reverse roller pair 199 and then conveyed toward the registration roller pair 117 through a two-sided conveyance path 218. The sheet S passes through the secondary transfer portion and the fixing device 118, whereby an image is formed on a second surface of the sheet S opposite to the first surface. Then, the sheet S is discharged from the housing 101A by the discharge roller pair 191.

Figure 2A:
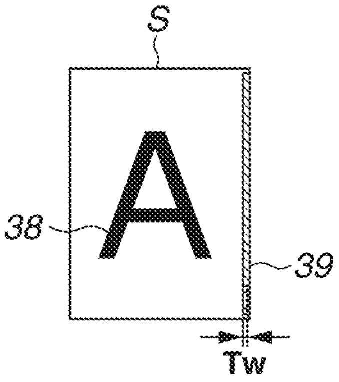
FIGS. 2A and 2B are diagrams illustrating a toner image formed on a sheet by the image forming apparatus according to the first embodiment.
Figure 2B:
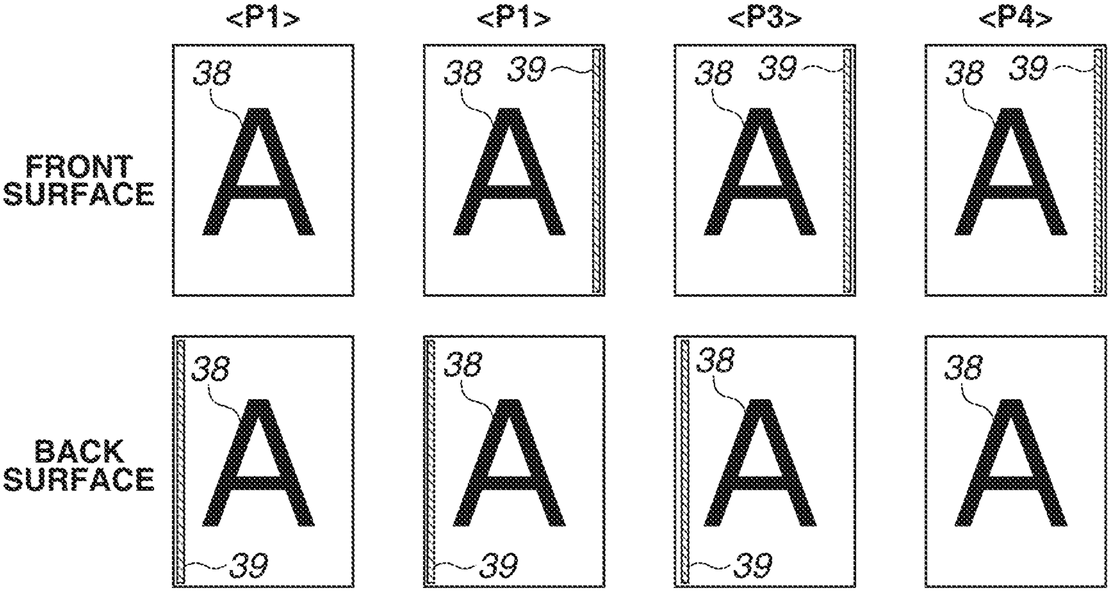

FIG. 2A is a schematic diagram illustrating an example of the toner image formed on the sheet S. On a sheet S illustrated in FIG. 2A, a toner image (recording toner image) 38 for recording an image of text, a figure, or a photograph, and a toner image (adhesion toner image) 39 for bonding sheets S are formed. In the present embodiment, a width Tw of the adhesion toner image 39 is 4.0 mm, and the amount (loading amount) of toner per unit area is 0.40 mg/cm$^2$. The amount of toner is measured in an unfixed state after secondary transfer and before a fixing process. The position, the shape, and the width of the adhesion toner image 39 can be changed according to the configuration of a heating pressurization unit 167 and the size of the sheet S. In the present embodiment, in a case where the image forming apparatus 101 creates a booklet, the adhesion toner image 39 is basically formed on both surfaces of each sheet S (except for the front cover and the back cover of the booklet). FIG. 2B illustrates the image layout of eight surfaces (four sheets×two surfaces) when a two-sided four-sheet booklet is produced using the sheet S according to the present embodiment. In the booklet according to the present embodiment, the adhesion toner image 39 is formed on six surfaces except for the front cover (the front surface of the first sheet S) and the back cover (the back surface of the fourth sheet S). Although the present embodiment is based on the premise of two-sided printing, the present invention is not limited to this. For example, the adhesion toner image 39 may be formed on only the front surface of each sheet S.

<Configuration of Toner, Method for Manufacturing Toner, and Method for Measuring Toner>

Next, a description is given of the configuration of toner having a thermoplastic resin as a main component that is used in the present embodiment. Examples of the thermoplastic resin include a polyester resin, a vinyl resin, an acrylic resin, a styrene acrylic resin, polyethylene, polypropylene, polyolefin, an ethylene-vinyl acetate copolymer resin, and an ethylene-acrylic acid copolymer resin. The toner may contain a plurality of resins among these resins. It is desirable that the toner is to further contain a wax. As the wax, known waxes such as an ester wax, which is an ester of alcohol and acid, and a hydrocarbon wax, e.g., a paraffin wax, can be used. The toner includes a black colorant, and may contain a magnetic substance, a charge control agent, a wax, and an external additive. To form an adhesion portion with the toner on a sheet S using the electrophotographic method, it is desirable that the weight average particle of the toner is to be 5.0 μm or more and 30

μm or less. It is more desirable that the weight average particle of the toner is to be 6.0 μm or more and 20 μm or less.

An example of the manufacturing of the toner is described.

| | |
|---|---|
| Styrene | 75.0 parts |
| N-butyl acrylate | 25.0 parts |
| Polyester resin | 4.0 parts |

(A polyester resin having a weight-average molecular weight (Mw) of 20000, a glass-transition temperature (Tg) of 75° C., and an acid value of 8.2 mgKOH/g)

Ethylene glycol distearate 14.0 parts (An ester wax obtained by esterifying ethylene glycol and stearic acid)

Hydrocarbon wax (HNP-9 manufactured by Nippon Seiro Co., Ltd.) 2.0 parts

Divinylbenzene 0.5 parts

A mixture obtained by mixing the above materials is kept warm at 60° C., agitated at 500 rpm using T.K. Homo Mixer (manufactured by Tokushu Kika Kogyo Co., Ltd.), and uniformly dissolved, thereby preparing a polymerizable monomer composition. On the other hand, 850.0 parts of 0.10 mol of an L-$Na_3PO_4$ aqueous solution and 8.0 parts of 10% hydrochloric acid are added into a container including high-speed agitation apparatus Clearmix (manufactured by M Technique Co., Ltd.) and heated to 70° C. by adjusting the number of revolutions of the high-speed agitation apparatus to 15000 rpm. 127.5 parts of 1.0 mol of an L-$CaCl_2$) aqueous solution are added to this product, thereby preparing an aqueous medium including a calcium phosphate compound. After the polymerizable monomer composition is put into the aqueous medium, 7.0 parts of t-butyl peroxypivalate as a polymerization initiator are added to this product, and the resulting product is granulated for 10 minutes while maintaining the number of revolutions at 15000 per minute. Then, the agitation machine is changed from the high-speed agitation apparatus to a propeller agitation wing. After this product is reacted for 5 hours at 70° C. while being refluxed, the liquid temperature is changed to 85° C., and the resulting product is reacted for 2 more hours. After the polymerization reaction ends, the obtained slurry is cooled, and hydrochloric acid is further added to the slurry, thereby setting pH to 1.4. Then, the slurry is agitated for 1 hour, thereby dissolving the calcium phosphate. Then, the slurry is washed with water three times as much as the slurry, filtered, dried, and then classified, thereby obtaining toner particles. Then, 2.0 parts of silica microparticles (the number average particle size of primary particles: 10 nm, the Brunauer-Emmett-Teller (BET) ratio surface area of the primary particles: 170 $m^2/g$) subjected to a hydrophobization process using dimethyl silicone oil (20 mass %) as an external additive are added to 100.0 parts of the toner particles, and the resulting product is mixed for 15 minutes at 3000 rpm using Mitsui Henschel mixer (manufactured by Mitsui Miike Machinery Company, Limited), thereby obtaining toner. The weight average particle of the obtained toner is 7.0 μm.

A method for measuring the storage elastic modulus as the viscoelasticity property of the toner is described. The storage elastic modulus of the toner is measured using dynamic viscoelasticity measurement apparatus (rheometer) ARES (manufactured by Rheometric Scientific). As a measurement jig, serrated parallel plates having a diameter of 7.9 mm are used.

A measurement sample: 0.1 g of a test piece is molded into a cylindrical sample having a diameter 8 mm and a height of 2 mm using a pressure molding machine (15 kN is maintained for 1 minute at a normal temperature). As the pressure molding machine, 100 kN press NT-100H manufactured by NPa System Co., Ltd. is used.

The temperature of the serrated parallel plates is adjusted to 120° C., the cylindrical sample is heated and melted, the serrations are caused to bite into the cylindrical sample, and a load is applied in the vertical direction so that the axial force does not exceed 30 (gf) (0.294 N), thereby firmly fixing the cylindrical sample to the serrated parallel plates. At this time, a steel belt may be used so that the diameter of the sample is the same as the diameter of the parallel plates. The serrated parallel plates and the cylindrical sample are annealed to a measurement start temperature of 30.00° C. for 1 hour.

The measurement frequency: 6.28 radians/second

The setting of measurement strain: the initial value is set to 0.1%, and the measurement is made in an automatic measurement mode.

The correction of the extension of the sample: the correction is adjusted in an automatic measurement mode.

The measurement temperature: the measurement temperature rises by 2° C. per minute from 30° C. to 140° C.

The measurement interval: viscoelasticity data is measured every 30 seconds, i.e., every 1° C.

Figure 3:
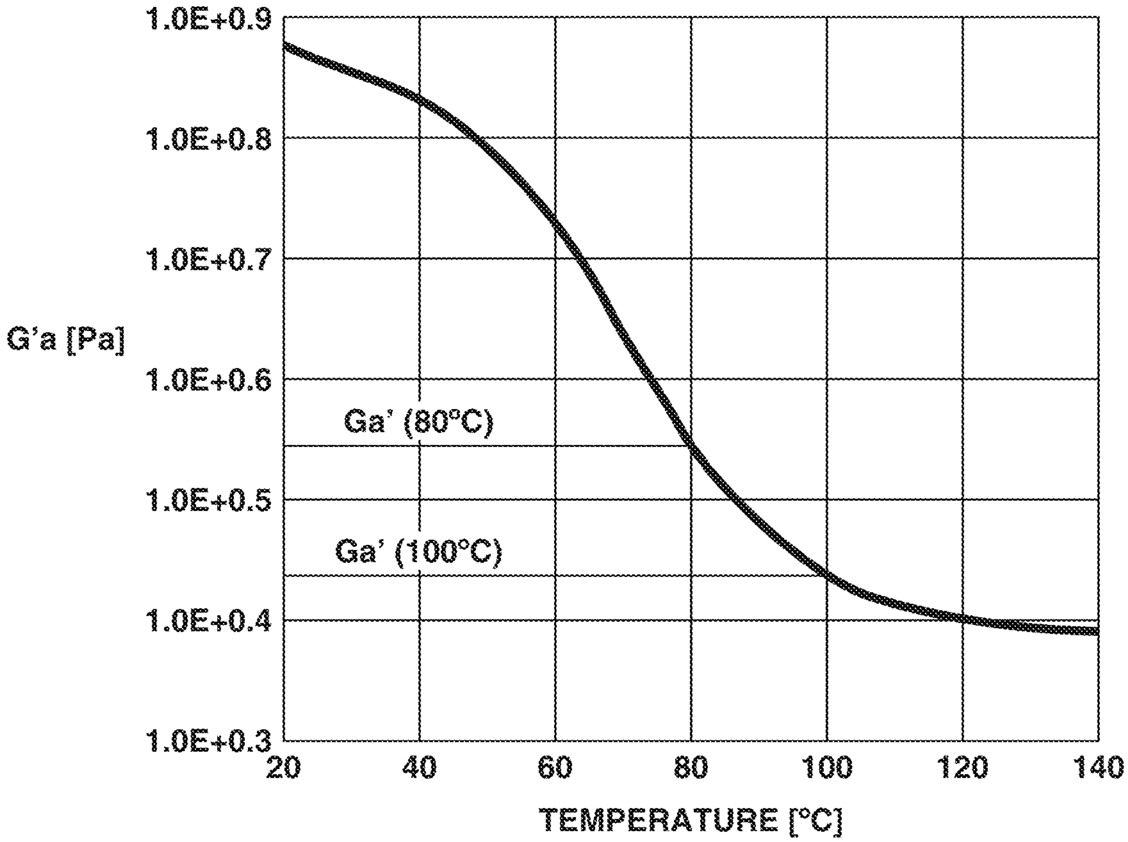
FIG. 3 illustrates a measurement result of a storage elastic modulus of toner.

FIG. 3 illustrates the measurement results of the storage elastic modulus of the toner. As the representative value of the storage elastic modulus, a storage elastic modulus Ga' (100° C.)=$2.2\times10^4$ Pa at 100° C. and a storage elastic modulus Ga' (80° C.)=$3.2\times10^5$ Pa at 80° C. are obtained. The reason for selecting the value at 100° C. is that the temperature of the toner on a sheet S when the toner is fixed rises to about 100° C. while the sheet S passes through a fixing nip portion 6N of the fixing device 118. The reason for selecting the value at 80° C. is that when the heating pressurization unit 167 performs a bonding process on a bundle of sheets, the minimum toner temperature when up to five sheets S are bonded at a time is about 80° C.

(Booklet Production Apparatus)

In FIG. 1, the booklet production apparatus 106 includes a buffer section 120 as a buffer method that piles up a plurality of sheets S, an alignment section 156 as an alignment method that aligns a plurality of sheets S, and an elongate heating pressurization unit 167 that thermocompression-bonds sheets S. The heating pressurization unit 167 is an example of a sheet bonding device (a bonding unit, a bonding method, a thermocompression bonding method, or a pasting processing section) that bonds sheets S. The booklet production apparatus 106 also includes a discharge upper tray 125 and a discharge lower tray 137, each capable of moving up and down, as discharge destinations to which the booklet production apparatus 106 discharges a final product of the image forming apparatus 101.

The booklet production apparatus 106 is a booklet production apparatus that receives a plurality of sheets S on each of which an image is formed by the image forming apparatus 101, performs a bonding process (thermocompression bonding) on the plurality of sheets S, and discharges the plurality of sheets S as a bundle of sheets (a booklet). The buffer section 120, the alignment section 156, and the heating pressurization unit 167 will be described in detail below. The booklet production apparatus 106 can also discharge a sheet S on which an image is formed by the image forming apparatus 101 to the discharge upper tray 125 or the discharge lower tray 137 without processing the sheet S.

(Buffer Section)

Figure 4:
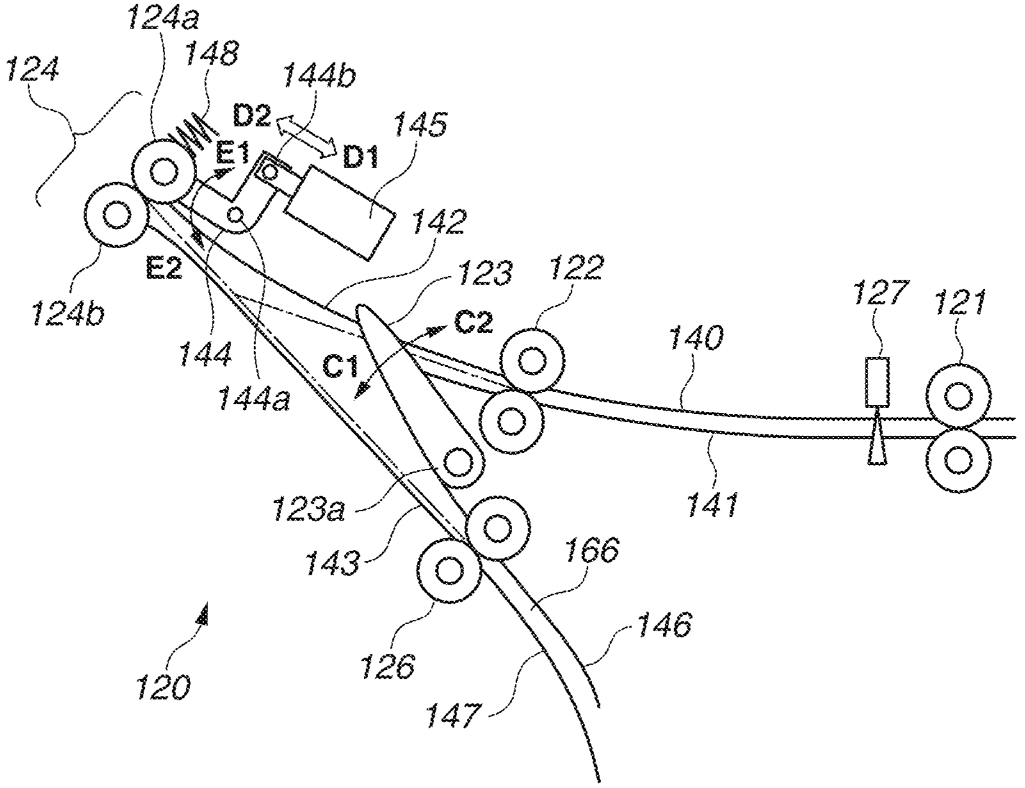
FIG. 4 is a diagram illustrating a buffer section of a booklet production apparatus according to the first embodiment.

With reference to FIG. 4, the buffer section 120 is described. FIG. 4 is an enlarged cross-section view of the buffer section 120. The buffer section 120 includes an entry roller pair 121, a pre-buffer roller pair 122, a backflow prevention flap 123, a reverse roller pair 124, and an inner discharge roller pair 126. The buffer section 120 includes an entry sensor 127 that detects a sheet S, and a separation mechanism composed of a plunger solenoid 145 to open and close the reverse roller pair 124 (cause the reverse roller pair 124 to abut and separate from each other). Each of the entry roller pair 121, the pre-buffer roller pair 122, the reverse roller pair 124, and the inner discharge roller pair 126 is a roller pair that nips and conveys a sheet S. The entry roller pair 121 and the pre-buffer roller pair 122 are placed in a conveyance path (an entry path) for the booklet production apparatus 106 to receive a sheet S. The reverse roller pair 124 is placed in a conveyance path 139 (see FIG. 1) that communicates with the discharge upper tray 125. The inner discharge roller pair 126 is placed in a conveyance path (an inner discharge path 166, see FIG. 1) from the reverse roller pair 124 to the heating pressurization unit 167. The booklet production apparatus 106 includes a discharge conveyance path 138 (see FIG. 1) from the heating pressurization unit 167 to the discharge lower tray 137. The entry path is formed by an entry upper guide 140 and an entry lower guide 141. A first discharge path is formed by a reverse upper guide 142 and a reverse lower guide 143. The inner discharge path 166 is formed by an inner discharge upper guide 146 and an inner discharge lower guide 147. The entry sensor 127 is placed to detect a sheet S received by the entry roller pair 121. For example, as the entry sensor 127, a reflective photosensor can be used that determines the presence or absence of a sheet S by emitting infrared light to the entry path through an opening provided in the entry upper guide 140 and detecting reflected light from a sheet S.

In the entry lower guide 141, a hole having a diameter greater than or equal to the spot diameter of infrared light emitted from the entry sensor 127 may be provided so that the entry lower guide 141 does not reflect infrared light when a sheet S does not pass through the entry path.

The backflow prevention flap 123 is placed downstream of the pre-buffer roller pair 122 in a sheet conveyance direction in the entry path. The backflow prevention flap 123 is placed rotatably about a rotating shaft 123*a* relative to the inner discharge upper guide 146. The backflow prevention flap 123 can move to a first position for preventing the movement (backflow) of a sheet S from the first discharge path to the entry path and a second position for allowing the movement of a sheet S from the entry path to the first discharge path. The backflow prevention flap 123 is biased in a direction C2 from the second position to the first position by a spring (not illustrated). The backflow prevention flap 123 is configured to move in a direction C1 from the first position to the second position by being pressurized by a sheet S, and return to the first position if the sheet S passes through the backflow prevention flap 123. When viewed in the rotational axis direction of the backflow prevention flap 123, a tip portion of the backflow prevention flap 123 at the first position overlaps the reverse upper guide 142. The tip portion of the backflow prevention flap 123 is formed into a pectinate shape so that the tip portion can overlap the reverse upper guide 142. When viewed in the rotational axis direction of the backflow prevention flap 123, a space through which a sheet S can pass is formed between the backflow prevention flap 123 at the second position and the reverse upper guide 142.

The reverse roller pair 124 is composed of a reverse upper roller 124*a* and a reverse lower roller 124*b*, and drive is supplied to both rollers. The rotations of the reverse upper roller 124*a* and the reverse lower roller 124*b* are configured to be always synchronized with each other. To the reverse upper roller 124*a*, a separation lever 144 is connected. The separation lever 144 is supported pivotably about a lever fulcrum shaft 144*a* relative to the reverse upper guide 142. The separation lever 144 is rotatably connected to the plunger solenoid 145 at a solenoid connection shaft 144*b*.

If a current flows through the plunger solenoid 145, a core moves in a direction D1 in FIG. 4, and therefore, the separation lever 144 pivots in a direction E1 in FIG. 4. In this case, the reverse roller pair 124 enters a separation state where the reverse upper roller 124*a* and the reverse lower roller 124*b* are separate from each other (the state where a nip portion is released). If the current flowing through the plunger solenoid 145 stops, the reverse upper roller 124*a* moves in a direction E2 and the core of the plunger solenoid 145 moves in a direction D2 by the biasing force of a pressure spring 148. In this case, the reverse roller pair 124 enters an abutment state where the reverse upper roller 124*a* and the reverse lower roller 124*b* abut each other (the state where the nip portion is formed).

(Buffer Operation)

Next, the operation of the buffer section 120 is described. FIGS. 5A to 5H are diagrams illustrating the operation of the buffer section 120. In the following description, a sheet S1, a sheet S2, and a sheet S3 are conveyed in this order from the image forming apparatus 101 to the booklet production apparatus 106. As described below, the buffer section 120 performs an operation of placing a newly conveyed sheet S on top of sheets S (a bundle of sheets) while reciprocating the sheets S (the bundle of sheets) between the reverse roller pair 124 and the inner discharge roller pair 126 (hereinafter referred to as a "buffer operation"). The booklet production apparatus 106 accelerates the conveyance speed of each sheet S in the apparatus. In the following description, the conveyance speed of each sheet S by the entry roller pair 121 is V1, and the conveyance speed of each sheet S by the pre-buffer roller pair 122, the reverse roller pair 124, and the inner discharge roller pair 126 (the conveyance speed after the acceleration) is V2.

Figure 5A:
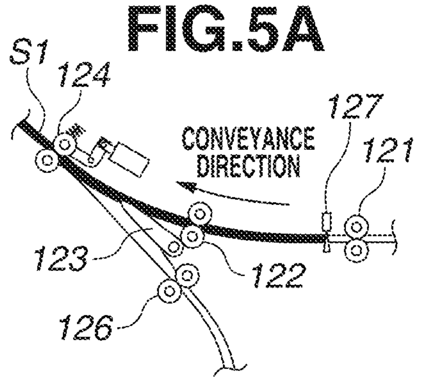
FIGS. 5A and 5H are diagrams illustrating an operation of the buffer section according to the first embodiment.
Figure 5B:
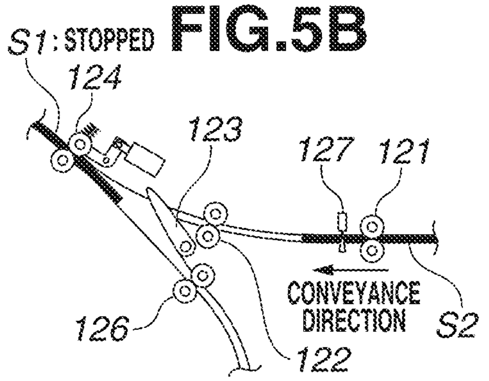
Figure 5C:
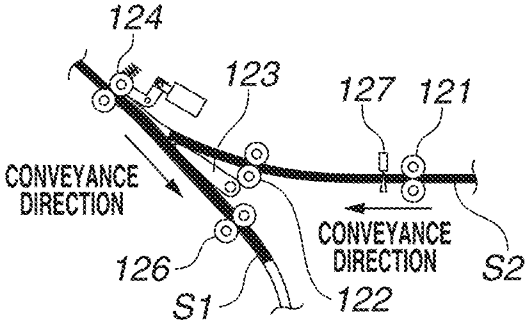
Figure 5D:
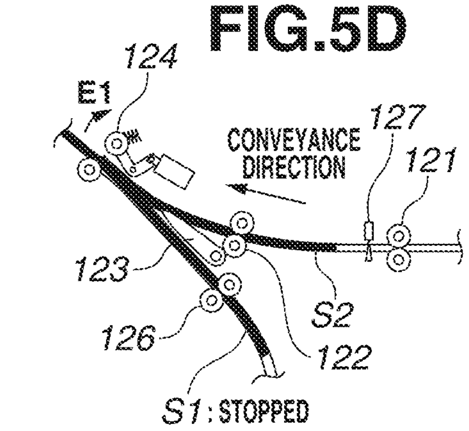
Figure 5E:
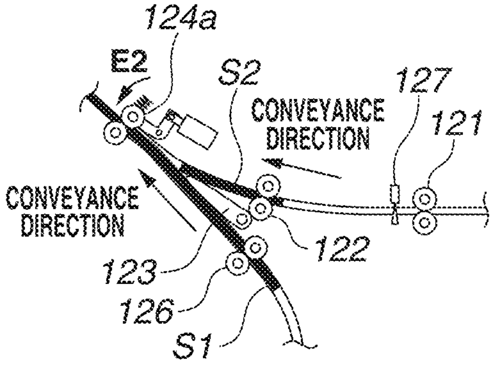
Figure 5F:
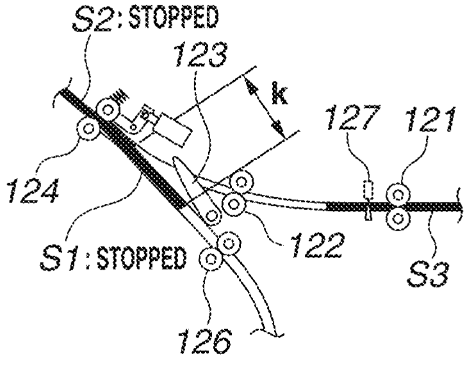
Figure 5F:
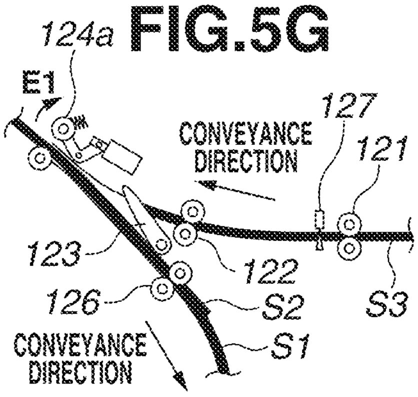
Figure 5F:
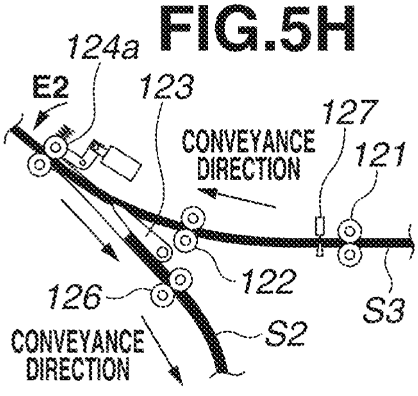

As illustrated in FIG. 5A, if the rear end of the preceding sheet S1 passes through the entry sensor 127, the conveyance speed of the sheet S1 by the pre-buffer roller pair 122 and the reverse roller pair 124 is accelerated from V1 to V2. This widens the conveyance interval between the sheet S1 and the subsequent sheet S2, and therefore, the reverse roller pair 124 can switch back the sheet S1 without the sheet S2 colliding with the sheet S1. As illustrated in FIG. 5B, if the rear end of the sheet S1 comes out of the backflow prevention flap 123, the conveyance of the sheet S1 by the reverse roller pair 124 is temporarily stopped. As illustrated in FIG. 5C, the reverse roller pair 124 changes its rotational direction and conveys the sheet S1 toward the inner discharge roller pair 126. As illustrated in FIG. 5D, at the position where the sheet S1 is conveyed by a predetermined amount after the front end of the sheet S1 passes through the inner discharge roller pair 126, the conveyance of the sheet S1 by the reverse roller pair 124 and the inner discharge roller pair 126 stops. After the sheet S1 is nipped by the inner discharge roller pair 126, the reverse upper roller 124*a* moves in the direction E1. Consequently, the reverse roller pair 124 separates from each other and enters the state where the reverse roller pair 124 can receive the subsequent sheet S2. After the reverse upper roller 124*a* separates from each other, the subsequent sheet S2 is conveyed to the reverse roller pair 124. As illustrated in FIG. 5E, if the rear end of the subsequent sheet S2 passes through the entry sensor 127, then similarly to the sheet S1, the conveyance speed of the sheet S2 is accelerated from V1 to V2. At the timing when the sheet S2 reaches a predetermined target position, the inner discharge roller pair 126 conveys the sheet S1 toward the reverse roller pair 124. At the timing when the speeds of the sheets S1 and S2 are approximately equal to each other (the difference in speed between the sheets S1 and S2 is substantially 0), the reverse upper roller 124*a* moves in the direction E2, and the reverse roller pair 124 abuts each other. In the abutment, the reverse roller pair 124 simultaneously nips the sheets S1 and S2. The speed of the reverse roller pair 124 is adjusted to be equal to the conveyance speeds of the sheets S1 and S2 by the time when the reverse roller pair 124 switches from the separation state to the abutment state. As illustrated in FIG. 5F, after the rear end of the sheet S2 passes through the backflow prevention flap 123, the reverse roller pair 124 temporarily stops again. The target position is set so that the sheet S1 protrudes further than the sheet S2 by a predetermined amount k in a conveyance direction from the inner discharge roller pair 126 to the alignment section 156. In other words, among a bundle of sheets piled up in the buffer section 120, the sheet S1 to be on the lower side in the alignment section 156 protrudes further than the sheet S2 to be on the upper side in the alignment section 156 by the predetermined amount k downstream in the conveyance direction toward the alignment section 156. As illustrated in FIG. 5G, the reverse roller pair 124 changes its rotational direction and conveys the sheets S1 and S2 toward the inner discharge roller pair 126. The sheets S1 and S2 are conveyed toward the alignment section 156 by the inner discharge roller pair 126. After the sheet S1 is nipped by the inner discharge roller pair 126, the reverse upper roller 124*a* moves in the direction E1. Consequently, the reverse roller pair 124 separates from each other and enters the state where the reverse roller pair 124 can receive the subsequent sheet S3. As illustrated in FIG. 5H, after the rear end of the sheet S2 comes out of the reverse roller pair 124, the reverse upper roller 124*a* moves in the direction E2. Consequently, the reverse roller pair 124 enters the abutment state and nips and conveys the sheet S3.

By repeatedly performing the buffer operation, the buffer section 120 can send sheets S to the alignment section 156 in the state where a predetermined number of sheets S are piled up. Although the buffer operation of piling up two sheets S has been described as an example, after the conveyance of the sheets S1 and S2 is temporarily stopped in the state in FIG. 5G, the sheets S1 and S2 are conveyed in the opposite direction, whereby it is possible to further pile up the sheet S3 on the sheets S1 and S2. That is, by repeating the operation in FIGS. 5D to 5G, the buffer section 120 can create a bundle of sheets in which three or more (e.g., five) sheets S are piled up.

The target position for piling up sheets S is determined based on the timing when the entry sensor 127 detects the rear end of a sheet S. Thus, even if the lengths in the conveyance direction of sheets S change, it is possible to pile up the sheets S in the state where the sheets S are shifted by a predetermined amount by the buffer operation according to the present embodiment.

As illustrated in FIG. 1, a bundle of sheets piled up in the buffer section 120 is conveyed from the inner discharge roller pair 126 through an intermediate conveyance roller pair 128 to a carry-in conveyance path 165 and a kick-out roller pair 129. Then, the kick-out roller pair 129 conveys the bundle of sheets to the alignment section 156 (an intermediate stacking section or a processing stage) composed of an intermediate upper guide 151 and an intermediate lower guide 152. Downstream of the kick-out roller pair 129, a bundle holddown flag 150 is placed that prevents the turning up of the rear end of a sheet S already stacked in the alignment section 156 so that the rear end of the stacked sheet S and the front end of a subsequent sheet S conveyed to the alignment section 156 do not interfere with each other.

(Configuration of Alignment Section)

Figure 6:
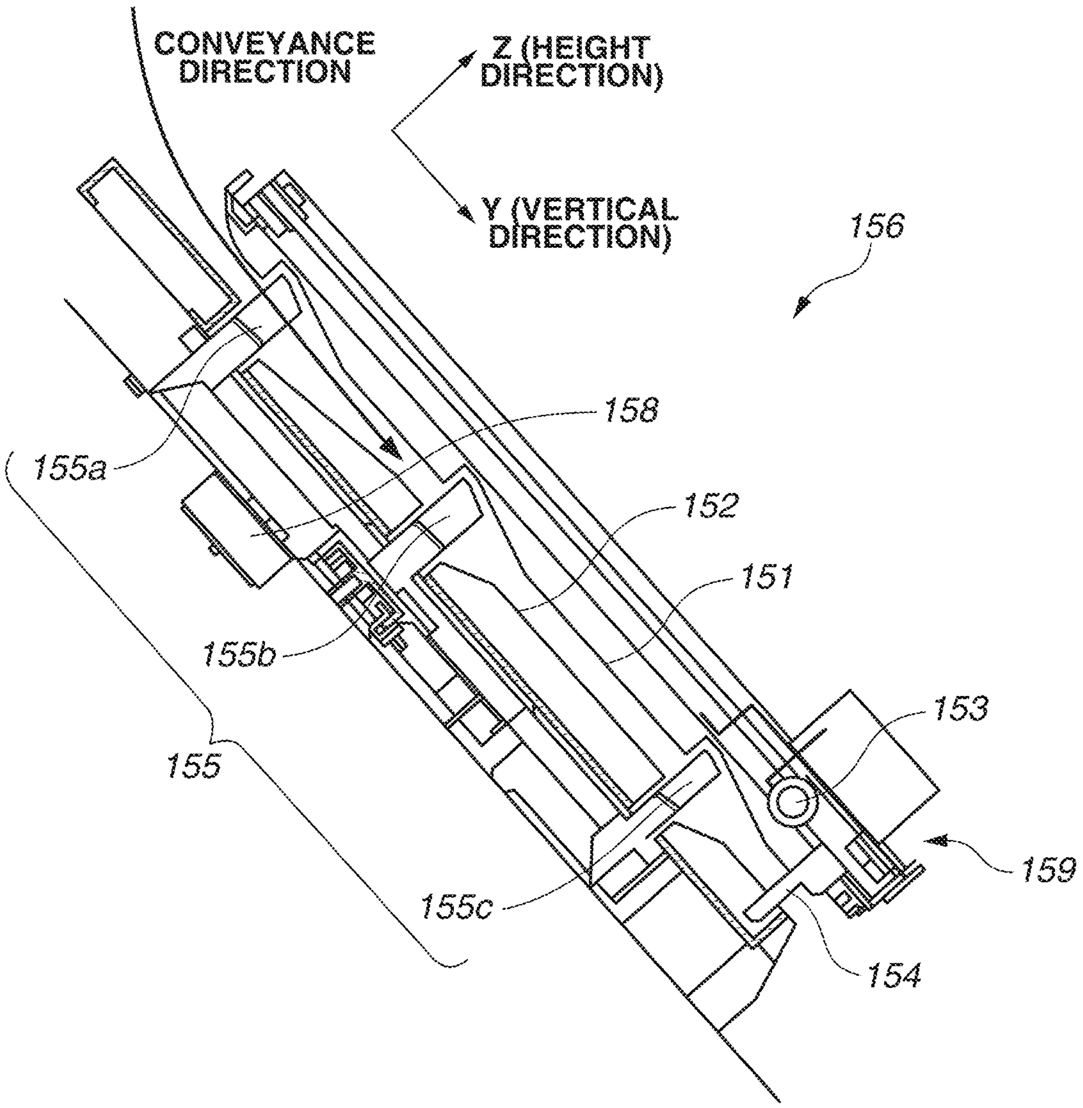
FIG. 6 is a diagram illustrating an alignment section of the booklet production apparatus according to the first embodiment.
Figure 7:
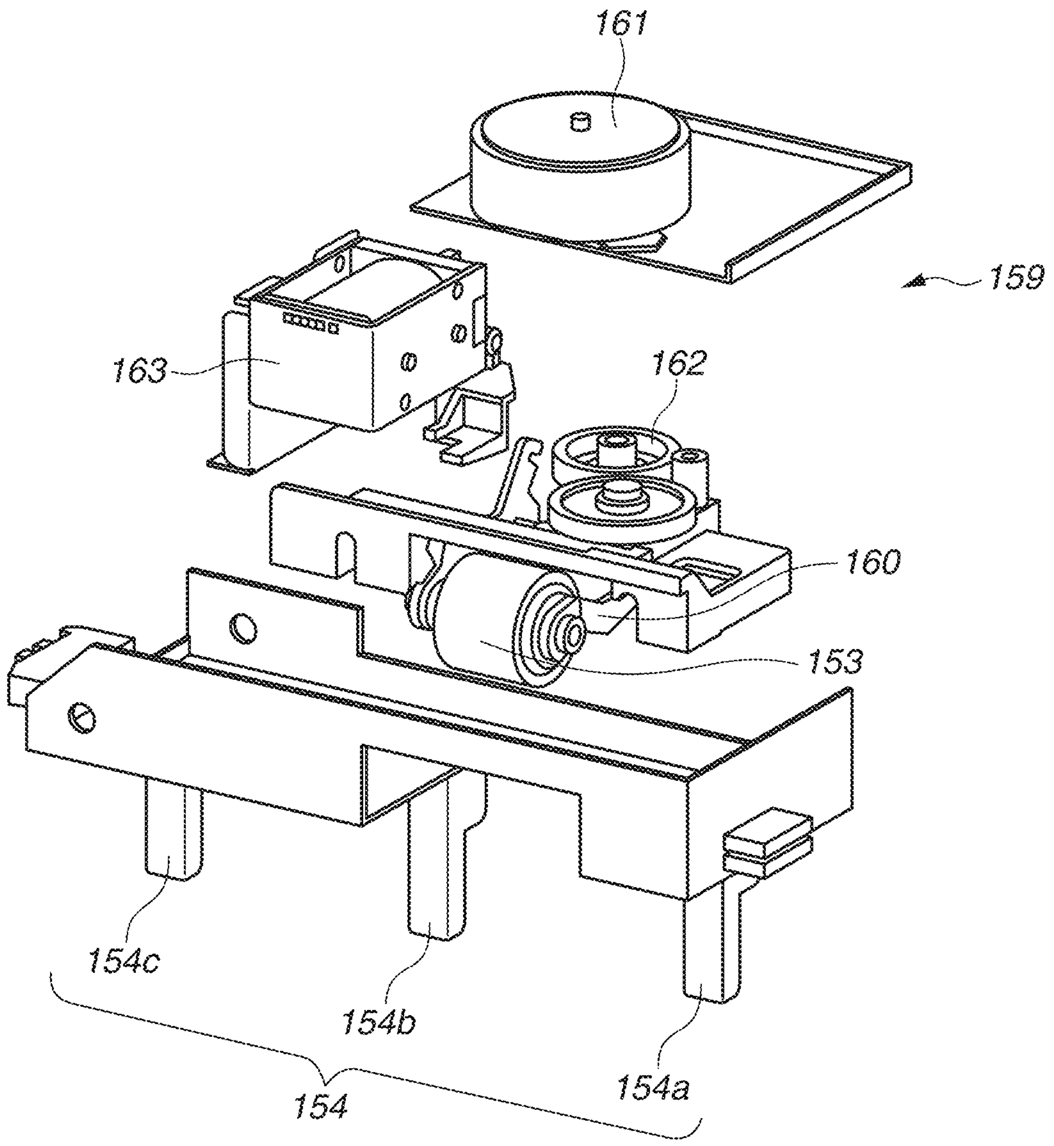
FIG. 7 is a diagram illustrating a movable unit of the alignment section according to the first embodiment.

Next, with reference to FIGS. 6 and 7, the configuration of the alignment section 156 is described. FIG. 6 is a cross-sectional view of the alignment section 156. FIG. 7 is an exploded view of the components of a movable unit 159. In the following description and the drawings, the direction in which a pressurization member of the heating pressurization unit 167 moves relative to a reception member 180 to pressurize a bundle of sheets is a Z-direction. The Z-direction is the height direction (the thickness direction) of a bundle of sheets stacked in the alignment section 156. In a virtual plane orthogonal to the Z-direction, directions orthogonal to each other are an X-direction and a Y-direction. The directions of arrows X, Y, and Z illustrated in the drawings are represented as a "positive X-side", a "positive Y-side", and a "positive Z-side", and the opposite sides of the positive X-side, the positive Y-side, and the positive Z-side are represented as a "negative X-side", a "negative Y-side", and a "negative Z-side", respectively, where necessary. In the present embodiment, the Y-direction is substantially parallel to the conveyance direction in which a sheet S is conveyed to the alignment section 156 by the kick-out roller pair 129. In the present embodiment, the X-direction is a sheet width direction orthogonal to the conveyance direction. In the following description, the Y-direction is occasionally referred to as a "vertical direction", and the X-direction is occasionally referred to as a "width direction" or a "horizontal direction".

The alignment section 156 includes the intermediate lower guide 152 as a stacking section that supports a bundle of sheets, the intermediate upper guide 151 opposed to the intermediate lower guide 152, and a movable unit 159 including a vertical alignment plate 154 and a vertical alignment roller 153.

Figure 8A:
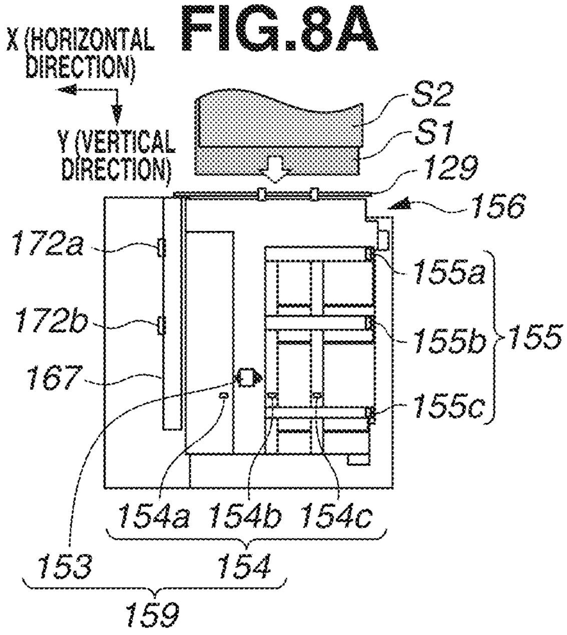
FIGS. 8A to 8F are diagrams illustrating an operation of the alignment section according to the first embodiment.

As illustrated in FIG. 7, the vertical alignment plate 154 includes a plurality of sheet abutment portions 154*a*, 154*b*, and 154*c* arranged next to each other in the sheet width direction. The sheet abutment portions 154*a*, 154*b*, and 154*c* are reference positions for aligning sheets S in the sheet conveyance direction (the Y-direction). The vertical alignment roller 153 is rotatably held by a roller holder 160. The roller holder 160 can swing by the driving force of a solenoid 163. The roller holder 160 swings, whereby the vertical alignment roller 153 can move to the position where the vertical alignment roller 153 abuts sheets S on the intermediate lower guide 152 and conveys the sheets S, and the position where the vertical alignment roller 153 is retracted upward from the sheets S. To the movable unit 159, a driving motor 161 is attached. The driving force of the driving motor 161 is transmitted to the vertical alignment roller 153 through a gear train 162, whereby the vertical alignment roller 153 rotates. The movable unit 159 can move as an integrated unit in the sheet conveyance direction (the Y-direction) relative to the intermediate lower guide 152. As illustrated in FIG. 6, the alignment section 156 includes a width alignment member 155, a driving motor 158, and width alignment plates 172*a* and 172*b* (FIG. 8A). The width alignment member 155 can move in the sheet width direction (the X-direction) by the driving force of the driving motor 158. The width alignment member 155 includes a plurality of sheet pressurization portions 155*a*, 155*b*, and 155*c* arranged next to each other in the sheet conveyance direction. As illustrated in FIG. 8A, the width alignment plates 172*a* and 172*b* are composed of a plurality of plate-like members (sheet abutment portions) arranged next to each other in the sheet conveyance direction. The width alignment plates 172*a* and 172*b* are reference positions for aligning sheets S in the sheet width direction (the X-direction).

(Operation of Alignment Section)

With reference to FIGS. 8A to 8D, the operation of the alignment section 156 is described. FIGS. 8A to 8D are schematic diagrams illustrating the alignment section 156 when viewed from the upper side in the Z-direction. The intermediate upper guide 151 and the components regarding the driving of the heating pressurization unit 167 are not illustrated. In a case where a bundle of sheets is aligned in the alignment section 156, the movable unit 159 is positioned to a predetermined waiting position in advance in the sheet conveyance direction (the Y-direction) according to the sheet size. The "waiting position" refers to the position where the distance in the Y-direction from the nip position of the kick-out roller pair 129 to the sheet abutment portions 154*a* to 154*c* of the vertical alignment plate 154 is slightly longer than the length of sheets S. The operation of the alignment section 156 is described below based on an example where a bundle of sheets composed of five sheets S1 to S5 piled up in the buffer section 120 is conveyed. The number of sheets S of a bundle of sheets piled up in the buffer section 120 can be optionally changed, and is not limited to five.

Figure 8B:
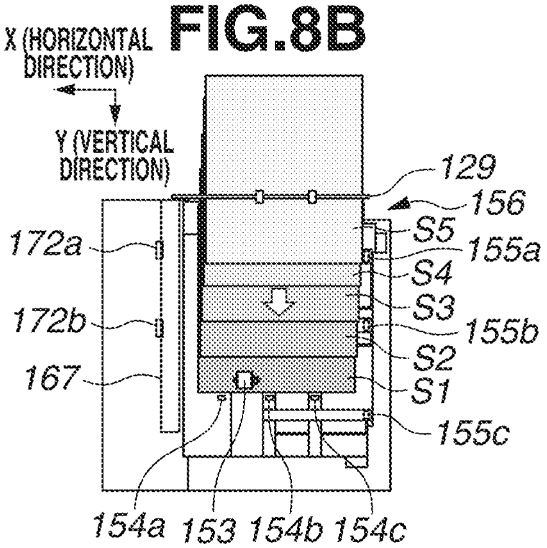
Figure 8C:
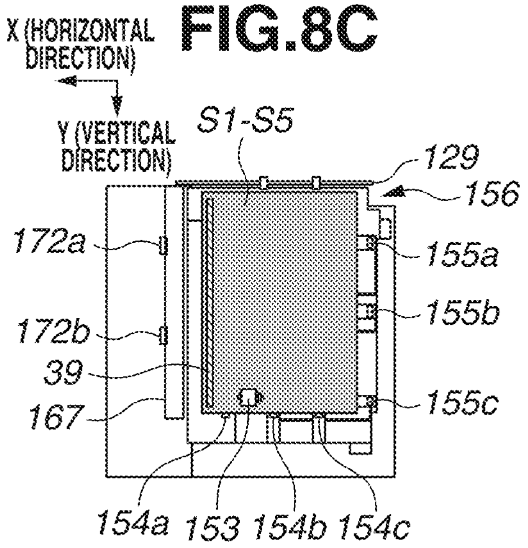
Figure 8D:
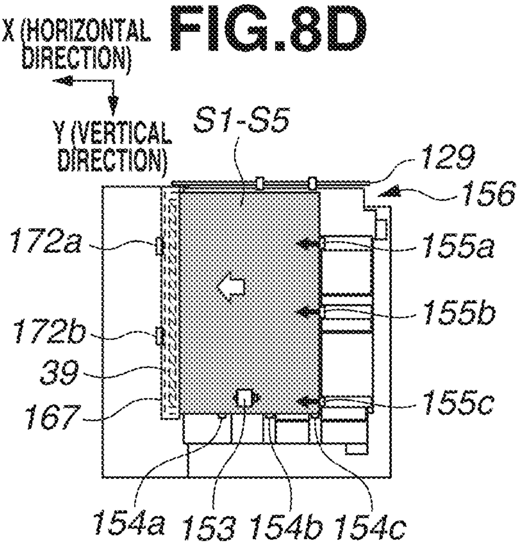
Figure 8E:
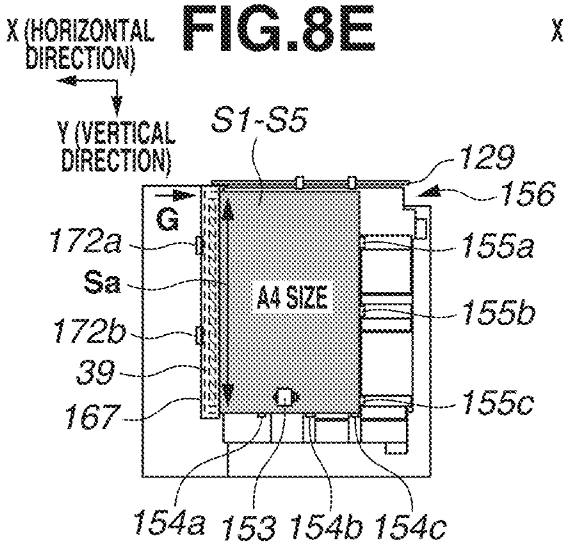
Figure 8F:
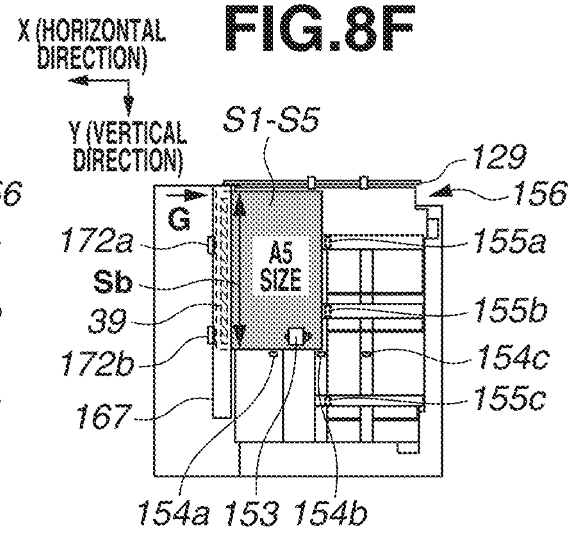

FIG. 8A illustrates the state where the first sheet S1 and the second sheet S2 are conveyed toward the alignment section 156. The movement of the movable unit 159 (the vertical alignment plate 154 and the vertical alignment roller 153) to the waiting position according to the sheet size is completed. The width alignment member 155 waits at a position slightly outward away from the side end position of the bundle of sheets so as not to hinder the conveyance of the bundle of sheets. FIG. 8B illustrates the state where the rear end of the first sheet S1 comes out of the nip of the kick-out roller pair 129 and the front end of the sheet S1 reaches the vertical alignment roller 153. The vertical alignment roller 153 is down to the abutment position in advance by applying a current to the solenoid 163, and is rotating by the driving motor 161. The sheet S1 is conveyed to the positive Y-side by the vertical alignment roller 153 and hit against the vertical alignment plate 154, thereby being aligned in the sheet conveyance direction. Then, when each of the subsequent sheets S2 to S5 comes out of the kick-out roller pair 129, the sheet S is conveyed to the positive Y-side by the vertical alignment roller 153 and hit against the vertical alignment plate 154, thereby being aligned in the sheet conveyance direction. FIG. 8C illustrates the state where each of the five sheets S1 to S5 is hit against the vertical alignment plate 154 and the alignment of the five sheets S1 to S5 in the sheet conveyance direction is completed. In this state, the width alignment member 155 is moved in the sheet width direction (the X-direction) by the driving force of the driving motor 158 (FIG. 6). One side end of the sheets S1 to S5 is pressurized by the sheet pressurization portions 155*a*, 155*b*, and 155*c* of the width alignment member 155, whereby the sheets S1 to S5 move toward the width alignment plates 172*a* and 172*b*. FIG. 8D illustrates the state where a side end of each of the sheets S1 to S5 is hit against the width alignment plates 172*a* and 172*b*. Consequently, the sheets S1 to S5 are aligned in the sheet width direction. Then, thermocompression bonding is performed by the heating pressurization unit 167 in the state where a plurality of sheets S in which adhesive layers are formed is piled up. In the present embodiment, the five sheets S1 to S5 are thermocompression-bonded. In a case where a booklet composed of six or more sheets S is created, the alignment section 156 prepares to receive sixth and subsequent sheets S in parallel with the thermocompression bonding of the sheets S1 to S5. Specifically, the width alignment member 155 is moved in a retracting direction (to the negative X-side). FIG. 8E illustrates the positions of sheets S after the sheets S are subjected to XY alignment in a case where the sheets S are of the A4 size. FIG. 8F illustrates the positions of sheets S after the sheets S are subjected to XY alignment in a case where the sheets S are of the A5 size. In the present embodiment, Y-alignment is performed by aligning one side end portion of sheets S to a vertical alignment reference position G of the heating pressurization unit 167 (one-side reference). The heating pressurization unit 167 is a device that performs long-side binding in the vertical direction on an end portion of sheets S. The maximum sheet width (Sa) with which the heating pressurization unit 167 is compatible is 297 mm. This corresponds to the A4 size (297 mm vertical×210 mm horizontal). The minimum sheet width (Sb) with which the heating pressurization unit 167 is compatible is 210 mm. This corresponds to the A5 size (210 mm vertical×149 mm horizontal).

(Heating Pressurization Unit)

Figure 9:
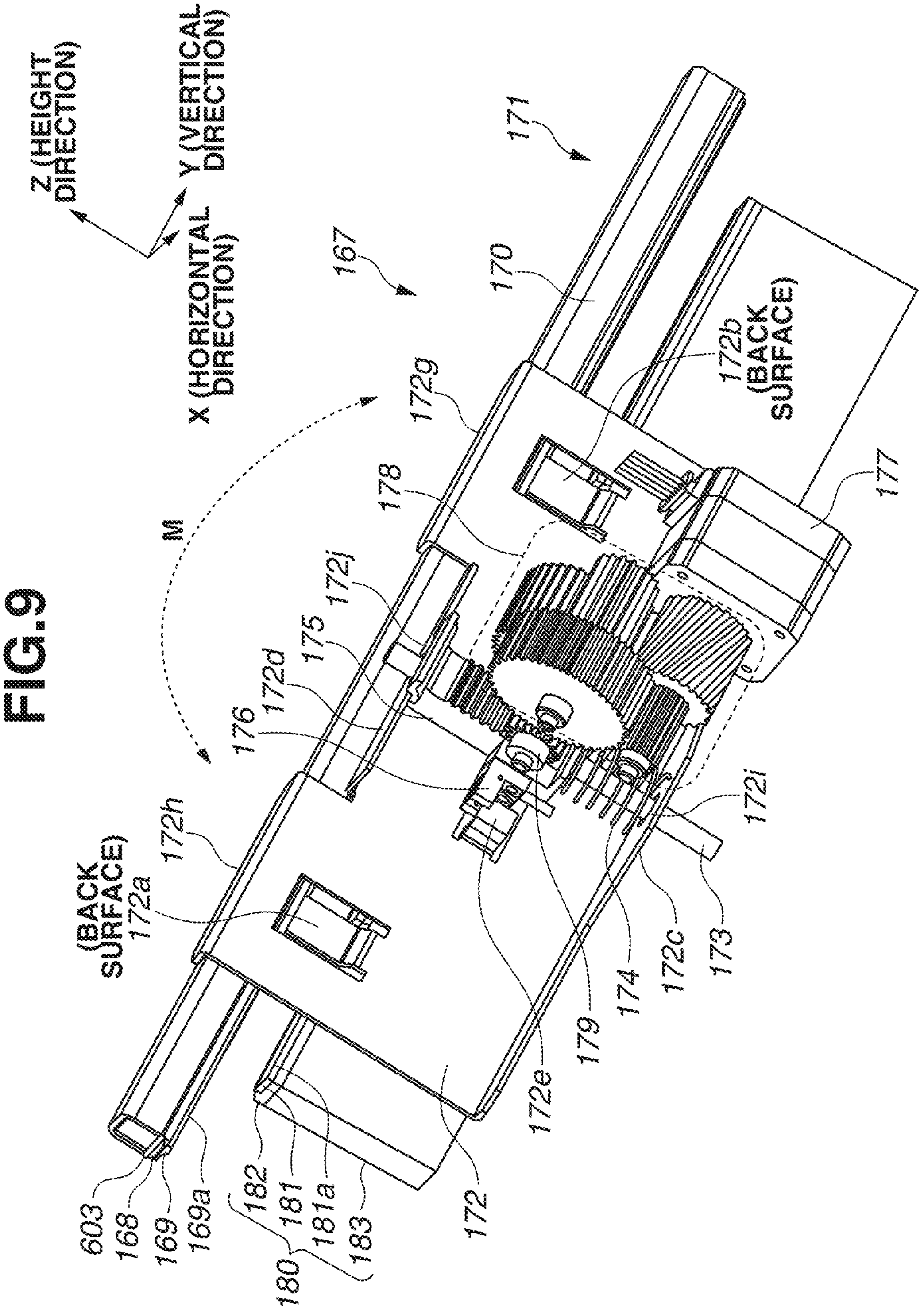
FIG. 9 is a diagram illustrating a heating pressurization unit according to the first embodiment.

With reference to FIG. 9, the configuration of the heating pressurization unit 167 according to the present embodiment is described. FIG. 9 is a perspective view of the heating pressurization unit 167. The heating pressurization unit 167 is an example of a sheet bonding device (a bonding unit, a bonding method, a thermocompression bonding method, or a pasting processing section) that bonds sheets S.

As illustrated in FIG. 9, the heating pressurization unit 167 includes a heater section 171 as a heating pressurization method including a pressurization plate 169, a reception member 180 that is opposed to the pressurization plate 169 and receives the pressurization force of the heater section 171, and a driving system including a motor 177. The reception member 180 is composed of a reception plate 181 formed of an elastic material, a reception plate supporting body 182 formed of a heat-resistant resin member that supports the reception plate 181, and a reception-side frame 183 made of a high-stiffness metal that further supports the reception plate supporting body 182. As the material of the reception plate 181, a silicone rubber sheet is used. The reception plate 181 has a plate thickness (the thickness in the Z-direction) of 3 mm and a rubber hardness of 70° (ISO 7619 standard). Although in the present embodiment, silicone rubber having heat resistance and moderate elasticity is used, the present invention is not limited to this. Alternatively, a material according to required heat resistance or elasticity and resistance to the pressurization force may be used. The heater section 171 includes the pressurization plate 169, a ceramic heater (heating member) 168 (FIGS. 10A to 10F), and a metal stay 170. The pressurization plate 169 is an example of a pressurization member that pressurizes a bundle of sheets as a bonding target. The pressurization plate 169 has a plate shape of which the thickness direction is the Z-direction and which is long and narrow in the Y-direction. As the material of the pressurization plate 169, an aluminum material (the A6063 material) is used. The pressurization plate 169 is basically formed with a thickness of 0.8 mm. The length in the Y-direction of the pressurization plate 169 is 300 mm. The Young's modulus of the aluminum material used in the pressurization plate 169 is 68 GPa, and a thermal conductivity $\lambda_p$ of the aluminum material is 237 W/mK. A high thermal conduction material such as aluminum (the A6063 material) is used in the pressurization plate 169, whereby it is easy to transfer the heat of the ceramic heater 168 to sheets S. The ceramic heater 168 is an example of a heating method that heats the pressurization member. The ceramic heater 168 is a heater substrate in which the pattern of a heating resistance element is formed on a substrate made of a ceramic. The ceramic heater 168 is placed in contact with the pressurization plate 169. The dimensions of the ceramic heater 168 are a thickness of 1.0 mm, a width of 8.0 mm, and a length of 350 mm, and a thermal conductivity $\lambda_n$ of the ceramic heater 168 is 22 W/mK. A thermal conductivity $\lambda$ is measured by a thermal conductivity measurement apparatus (ai-Phase Mobile 2 manufactured by Ai-Phase Co.). The Young's modulus of the ceramic heater 168 is 370 GPa. A heater supporting body 603 is a member for supporting the ceramic heater 168 and is fixed to the pressurization plate 169 and the metal stay 170 having stiffness. The metal stay 170 is made of iron and has a thickness of 1.8 mm. The stiffness of the metal stay 170 is further increased by bending the metal stay 170 into a U-shape. To the metal stay 170 of the heater section 171, a lift plate 172 is fixed. The lift plate 172 and the metal stay 170 abut each other in abutment portions 172*g* and 172*h*, and the lift plate 172 moves integrally with the heater section 171. In the present embodiment, the width alignment plates 172*a* and 172*b* are formed integrally with the lift plate 172 by bending a part of a metal plate member forming the lift plate 172. The lift plate 172 has slight gaps (172*i* and 172*j*) from a guide shaft 173, and therefore, when the pressurization plate 169 abuts a bundle of sheets, the lift plate 172 can swing in the Y-direction as indicated by a dotted line M, and can move somewhat following the sheet surfaces. Thus, even if the sheet surfaces are somewhat tilted or a moment force acts, the pressurization plate 169 can excellently pressurize the bundle of sheets.

The heating pressurization unit 167 can thermocompression-bond a bundle of sheets stacked in the alignment section 156 along a side extending in the Y-direction, using the pressurization plate 169 extending in the Y-direction. The alignment section 156 and the heating pressurization unit 167 according to the present embodiment can perform so-called long-side binding for aligning sheets of the A4 size in the direction in which the long side of the sheets is parallel to the sheet conveyance direction (a long-side sending direction), and thermocompression-bonding the sheets in an adhesion region (FIG. 2A) along the long side.

A driving system (a pressurization mechanism) for the heating pressurization unit 167 includes the motor 177 as a driving source, a gear train 178, a pinion gear 179, and a rack gear 175. The gear train 178, the pinion gear 179, and the rack gear 175 are an example of a drive transmission mechanism that converts the rotation of the motor 177 into the moving direction (the Z-direction) of the heater section 171 and transmits the converted rotation to the heater section 171. The pinion gear 179 is connected to the motor 177 via the gear train 178. The pinion gear 179 meshes with the rack gear 175. The gear train 178, the pinion gear 179, and the rack gear 175 form a speed reduction mechanism for obtaining a pressurization force required to thermocompression-bond a bundle of sheets. As the speed reduction mechanism, for example, a worm gear or a planetary gear mechanism may be used. The rack gear 175 reciprocates in the Z-direction by being guided by the cylindrical guide shaft 173 that extends in the Z-direction. The guide shaft 173 is fixed to a frame body of the heating pressurization unit 167. Between the rack gear 175 and a lower surface 172*c* of the lift plate 172, a compression spring 174 is placed that generates a force to cause the pressurization plate 169 pressurize sheets S. When the heater section 171 is separate in the Z-direction, the rack gear 175 hits an upper surface 172*d* of the lift plate 172 by the compression spring 174.

A photointerrupter 176 is held integrally with the rack gear 175 and detects that the relative position between the rack gear 175 and the lift plate 172 changes. A method that moves the heater section 171 up and down is the motor 177. The pinion gear 179 meshes with the rack gear 175 through the gear train 178 from a motor gear (not illustrated), whereby the rotation of the motor 177 is transmitted to the rack gear 175. In a case where the heating pressurization unit 167 thermocompression-bonds a bundle of sheets, the rack gear 175 moves in a pressurization direction (to the negative Z-side) by a driving force transmitted from the motor 177. Consequently, the lift plate 172 and the heater section 171 move in the pressurization direction (to the negative Z-side), and the pressurization plate 169 abuts the bundle of sheets. After the bundle of sheets is pressurized, the heater section 171 separates. A pressurization force K1 of the lift plate abutment portion 172*g* applied to the metal stay 170 is 15 kgf. A pressurization force K2 of the lift plate abutment portion 172*h* applied to the metal stay 170 is 15 kgf. That is, the sum of the pressurization forces K1 and K2 of the heating pressurization unit 167 applied to the bundle of sheets is 30 kgf.

Figure 10A:
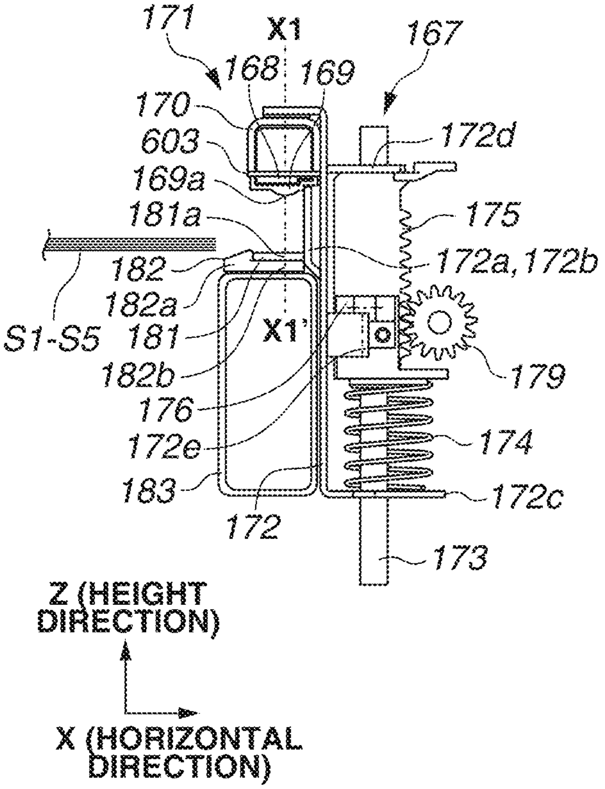
FIGS. 10A to 10F are diagrams illustrating an operation of the heating pressurization unit according to the first embodiment.

As illustrated in FIG. 10A, the pressurization plate 169 is so shaped that the pressurization plate 169 has a cross-sectional shape in which a center portion in the X-direction protrudes in the pressurization direction (to the negative Z-side), and the pressurization plate 169 extends in the Y-direction. The tip of a contact portion 169*a* that comes into contact with an upper surface of the bundle of sheets has a curved surface shape having a diameter of 2.5 mm to increase a surface pressure when a booklet is pressurized by concentrating the pressurization force of the heating pressurization unit 167, and corresponds to a pressurization center position (a cross section X1-X1') of the heating pressurization unit 167. The reception plate supporting body 182 includes a sheet guide portion 182*a* for conveying sheets S to the heating pressurization unit 167, and a reception plate supporting portion 182*b* that supports the reception plate 181 and receives the pressurization force of the heater section 171. The reception plate supporting portion 182*b* has the function of adjusting the pressurization force distribution in the longitudinal direction at a pressurization center position (the cross section X1-X1') of the heater section 171. The details will be described below. The reception-side frame 183 is flat on its contact surface with the reception plate supporting body 182. In the present embodiment, as the material of the reception plate supporting body 182, a polyphenylene sulfide (PPS) material having heat resistance is used.

The heater section 171 also includes a temperature detection method TH (not illustrated) for detecting the temperature of the ceramic heater 168. As the temperature detection method TH according to the present embodiment, a resistance element having a negative temperature coefficient (NTC) characteristic is used. The present invention, however, is not limited to this. Alternatively, a resistance element having a positive temperature coefficient (PTC) characteristic, various thermocouples, or a radiation thermometer may be used. The temperature detection method TH is placed at a position 149 mm from the vertical alignment reference position G as a sheet reference position by corresponding to a center portion on the long side of the A4 size in the heating pressurization unit 167. A control section of the booklet production apparatus 106 can control the detection temperature of the temperature detection method TH by a power application method (not illustrated) so that the temperature is a setting temperature (220° C.). The setting temperature is 220° C., whereby the toner temperature when up to five sheets S are bonded at a time can be set to be greater than or equal to a reference temperature of 80° C.

(Operation of Heating Pressurization Unit)

Figure 10B:
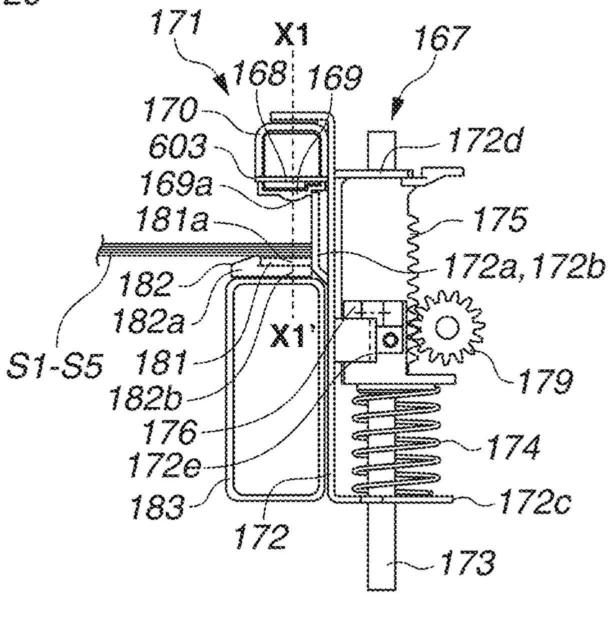
Figure 10C:
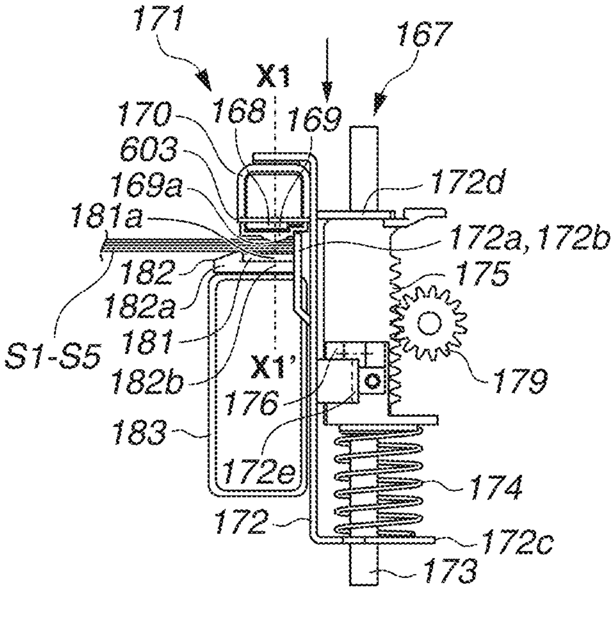
Figure 10D:
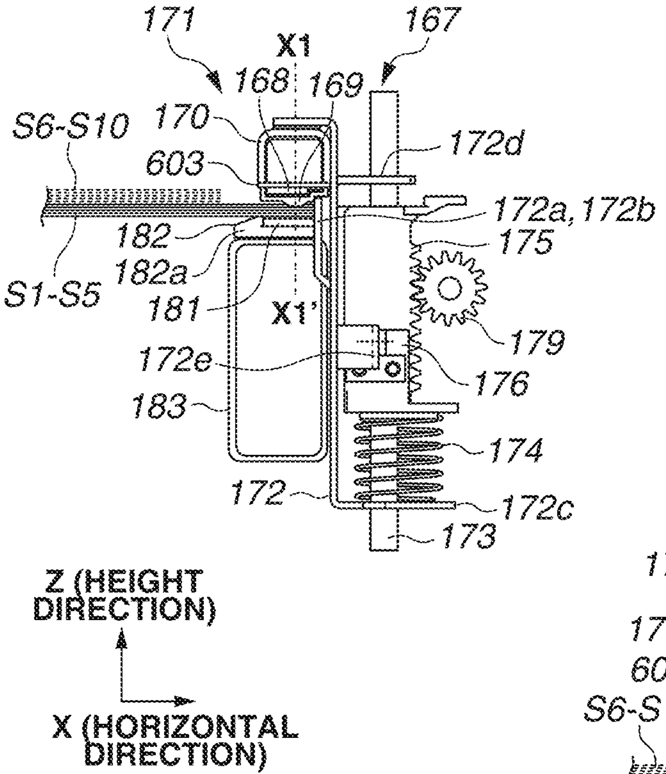

With reference to FIGS. 10A to 10F, the thermocompression bonding operation of the heating pressurization unit 167 is described. Each of FIGS. 10A to 10F is a diagram illustrating the heating pressurization unit 167 when viewed in the sheet conveyance direction (the Y-direction). FIG. 10A illustrates a state that is the same as that in FIG. 8C, i.e., the state where the alignment of the sheets S1 to S5 in the sheet conveyance direction (the Y-direction) is completed. In this state, the heater section 171 is at the position where the heater section 171 is separate from the bundle of sheets in the Z-direction. FIG. 10B illustrates a state that is the same as that in FIG. 8D, i.e., the state where the alignment of the sheets S1 to S5 in the width direction is completed. The sheets S1 to S5 are aligned in the sheet width direction (the X-direction) by being hit against the width alignment plates 172*a* and 172*b*. FIG. 10C illustrates the state where the heater section 171 moves in the pressurization direction (to the negative Z-side) by the forward rotation of the motor 177 and the contact portion 169*a* of the pressurization plate 169 abuts the top sheet S5. FIG. 10D illustrates the state of the middle of thermocompression-bonding the sheets S1 to S5 by nipping the sheets S1 to S5 between the pressurization plate 169 and the reception member 180 by continuing to drive the motor 177. The compression spring 174 contracts by being pushed by a lower surface of the rack gear 175, and the repulsion force of the compression spring 174 increases. The repulsion force of the compression spring 174 is applied through the lift plate 172 and the heater section 171, and the sheets S1 to S5 are pressurized by the pressurization plate 169 with a pressurization force having a total pressure of 30 kgf. In the present embodiment, the pressurization time is 3.0 seconds. The motor 177 is controlled to generate a predetermined pressurization force by stopping by a predetermined amount of rotation after light from the photointerrupter 176 is blocked by a rib 172*e* of the lift plate 172.

Figure 10E:
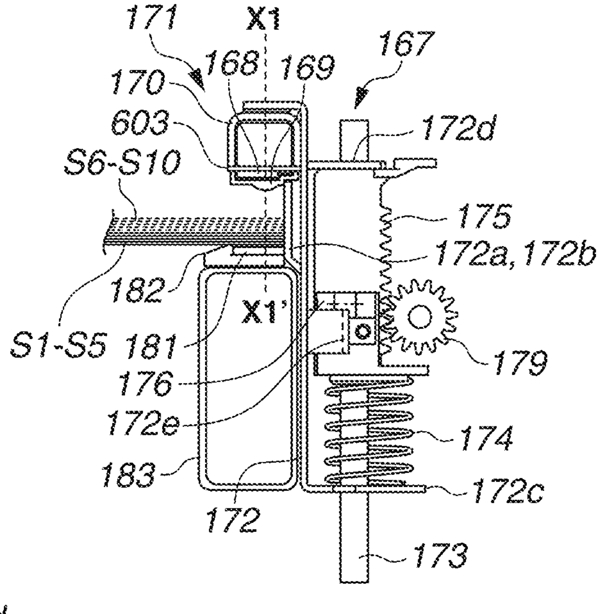
Figure 10F:
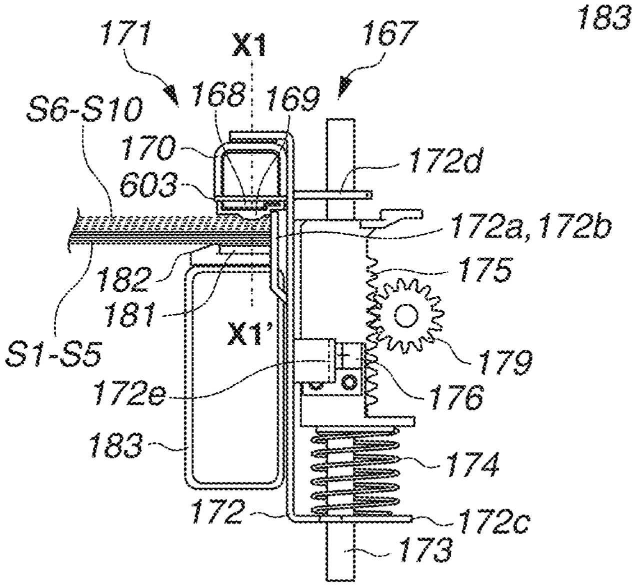

FIG. 10D also illustrates the state where next sheets S6 to S10 are conveyed to the alignment section 156 in parallel with the thermocompression bonding of the sheets S1 to S5. FIG. 10E illustrates the state where the pressurization plate 169 is separate from the sheet S5 by the heater section 171 moving (retracting) to the opposite side (the positive Z-side) of the pressurization direction by the backward rotation of the motor 177 after the thermocompression bonding of the sheets S1 to S5 is completed. FIG. 10E illustrates the state where the next sheets S6 to S10 are aligned, and the sheets S1 to S5 are hit against the width alignment plates 172*a* and 172*b* after the heater section 171 retracts. FIG. 10F illustrates the state of the middle of thermocompression-bonding the sheets S6 to S10 by nipping the sheets S1 to S10 between the pressurization plate 169 and the reception member 180 by the heater section 171 moving in the pressurization direction (to the negative Z-side) again by the forward rotation of the motor 177. The motor 177 is controlled to generate a predetermined pressurization force by stopping by a predetermined amount of rotation after light from the photointerrupter 176 is blocked by the rib 172*e* of the lift plate 172. Consequently, the action length of the compression spring 174 can be made the same between when the sheets S1 to S5 are thermocompression-bonded in FIG. 10D and when the sheets S6 to S10 are thermocompression-bonded in FIG. 10F. That is, even if the thickness of sheets S aligned in the heating pressurization unit 167 changes, it is possible to thermocompression-bond the sheets S by making a pressurization force to pressurize the bundle of sheets uniform. An adhesion toner image is formed on an upper surface of the sheet S5 and/or a lower surface of the sheet S6, whereby the bundle of sheets composed of the sheets S1 to S5 and the bundle of sheets composed of the sheets S6 to S10 are thermocompression-bonded. As described above, every time a bundle of a predetermined number of sheets S is aligned by the alignment section 156, the heating pressurization unit 167 performs the thermocompression bonding operation once, whereby it is possible to create a booklet composed of more sheets than the predetermined number. Although an example has been described where a booklet composed of 10 sheets S1 to S10 is created, a booklet composed of several tens or more of sheets can also be created. Although a description has been given of a sequence in which the thermocompression bonding operation is performed with respect to each predetermined number of sheets, the thermocompression bonding operation may be performed on any number of sheets each time, for example, by thermocompression-bonding two sheets first and then performing the thermocompression bonding operation on each sheet.

Figure 11A:
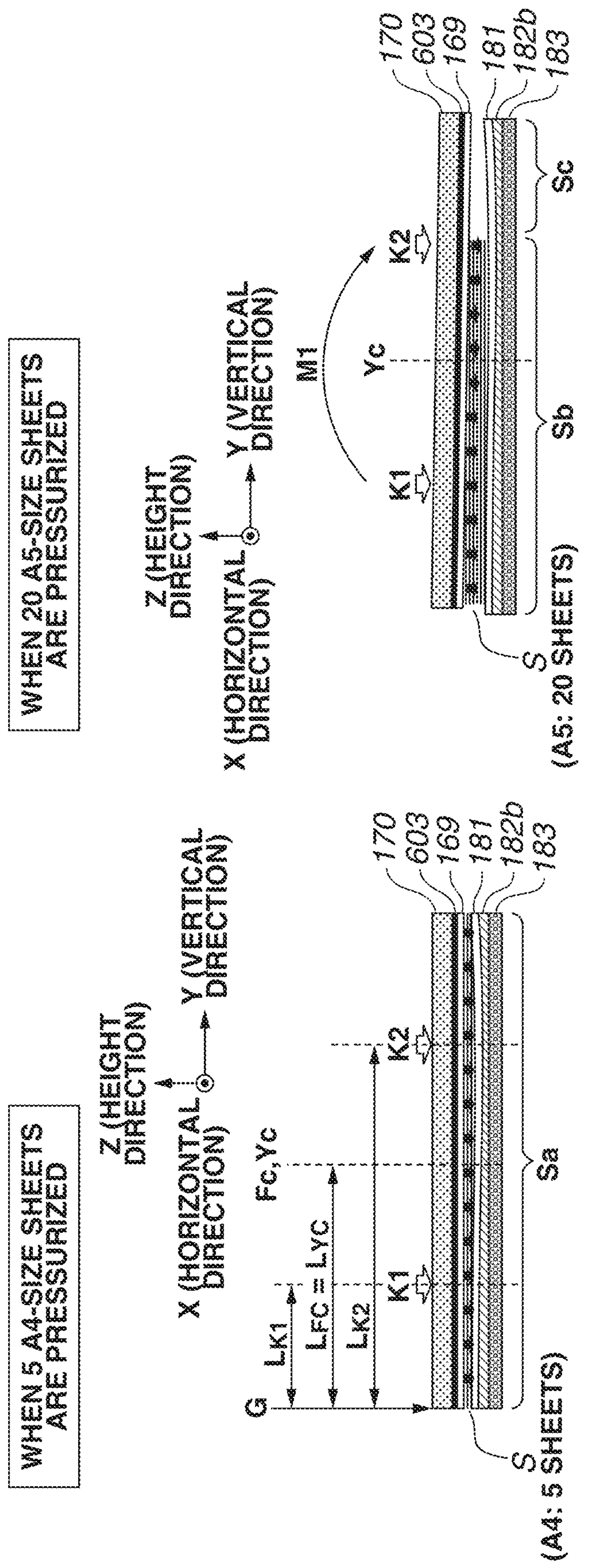
FIGS. 11A to 11C are diagrams illustrating a pressurization state of the heating pressurization unit according to the first embodiment.

Next, to confirm the action effects of the present embodiment, comparative verification of the present embodiment and comparative examples 1 and 2 is performed. The comparative verification is performed regarding the pressurization force distribution and the booklet adhesive strength of each heating pressurization unit 167. In the present embodiment, the shape of the reception plate supporting portion 182*b* of the heating pressurization unit 167 is appropriately adjusted relative to comparative examples 1 and 2, thereby adjusting the balance of the pressurization force distribution and ensuring an excellent booklet adhesive strength. FIG. 11A is a schematic diagram in the cross section X1-X1' when five A4-size sheets and 20 A5-size sheets are pressurized by the heating pressurization unit 167 according to the present embodiment. In the present embodiment, a pressurization center Fc of the pressurization forces K1 and K2 applied by the abutment portions 172*g* and 172*h* of the lift plate 172 in FIGS. 10A to 10F is the same as a center position Yc in the Y-direction of the heating pressurization unit 167. The distance from the vertical alignment reference position G for sheets present on one end portion side to the pressurization center position of the pressurization force K1 is $L_{K1}$ (75 mm), and the distance from the vertical alignment reference position G to the pressurization center position of the pressurization force K2 is $L_{K2}$ (225 mm).

The distance from the vertical alignment reference position G to the pressurization center Fc of the pressurization forces K1 and K2 is $L_{Fc}$ (150 mm). This is the same as the distance from the vertical alignment reference position G to the center position Yc in the Y-direction of the heating pressurization unit 167 (a distance $L_{Yc}$: 150 mm). That is, a configuration is employed in which a bundle of sheets is pressurized at the position where the pressurization forces K1 and K2 are symmetrical with respect to the center position Yc in the Y-direction of the heating pressurization unit 167. The width in the longitudinal direction of the heating pressurization unit 167 according to the present embodiment is matched to the A4 size, which is a sheet width of the maximum size. Thus, when A4-size sheets are pressurized, a large part of the pressurization portion of the heating pressurization unit 167 is a sheet width Sa of the A4-size sheets. Thus, the A4-size sheets can be stably pressurized in the Z-direction. On the other hand, when A5-size sheets, which are a sheet width of the minimum size, are pressurized, and if the number of sheets of a booklet increases (20 A5 sheets in FIG. 11A), a non-pressurization region Sc occurs besides the region where the A5-size sheets are pressurized. Specifically, a third region inside a first region where the heating pressurization unit 167 pressurizes the A4-size sheets (A4 (Sa) in FIG. 11B) and outside a second region where the heating pressurization unit 167 pressurizes the A5-size sheets (A5 (Sb) in FIG. 11B) is the non-pressurization region Sc. At this time, under the influence of the application of a rotational moment M1 to the heating pressurization unit 167 with the guide shaft 173 (FIG. 9) as a fulcrum, a bilateral difference in pressurization force occurs, albeit slightly, in the range of the sheet width Sb of the A5 width.

Figure 11B:
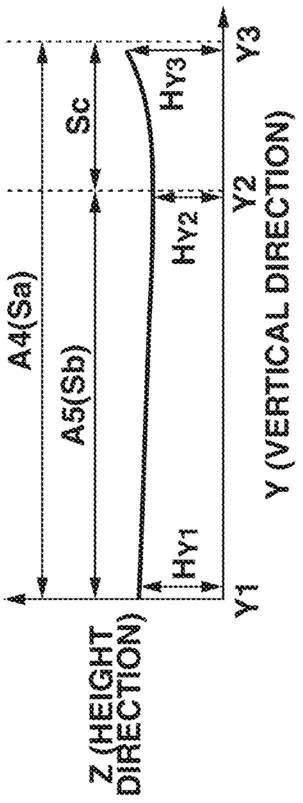

FIG. 11B illustrates the thickness of the reception plate supporting portion 182*b* when not pressurized in the cross section X1-X1' illustrated in FIGS. 10A to 10F. A thickness $H_{Y2}$ in the Z-direction (the sheet pressurization direction) at a point Y2 in an end portion of the sheet width Sb of the A5-size sheets is the smallest. The thickness of the reception plate supporting portion 182*b* is in a relationship where a thickness $H_{Y1}$ at a point Y1 corresponding to the vertical alignment reference position G and a thickness $H_{Y3}$ at a point Y3 in an end portion of the sheet width Sa of the A4-size sheets are greater than the thickness $HY_2$ ($H_{Y1}>H_{Y2}$, $HY_3>H_{Y2}$). In the present embodiment, $HY_1$ is 2.5 mm, $HY_2$ is 2.3 mm, and $HY_3$ is 2.6 mm. On a slope between the thicknesses $H_{Y1}$ and $H_{Y2}$ and a slope between the thicknesses $H_{Y2}$ and $H_{Y3}$, smooth curved surface shapes are formed. The slope between the thicknesses $H_{Y1}$ and $H_{Y2}$ ($H_{Y1}>H_{Y2}$) can increase the pressurization force on the Y1 side and decrease the pressurization force on the Y2 side. Thus, when the A5-size sheets are pressurized, the slope between the thicknesses $H_{Y1}$ and $H_{Y2}$ exerts the effect of preventing the concentration of the pressurization force on the Y2 side that occurs due to the rotational moment M1. The slope between the thicknesses $H_{Y2}$ and $H_{Y3}$ ($H_{Y3}>H_{Y2}$) can exert an effect only when the A4-size sheets are pressurized, and can exert the effect of balancing the slope between the thicknesses $H_{Y2}$ and $H_{Y3}$ ($H_{Y3}>H_{Y2}$) and the slope between the thicknesses $H_{Y1}$ and $H_{Y2}$ ($H_{Y1}>H_{Y2}$).

Figure 11C:
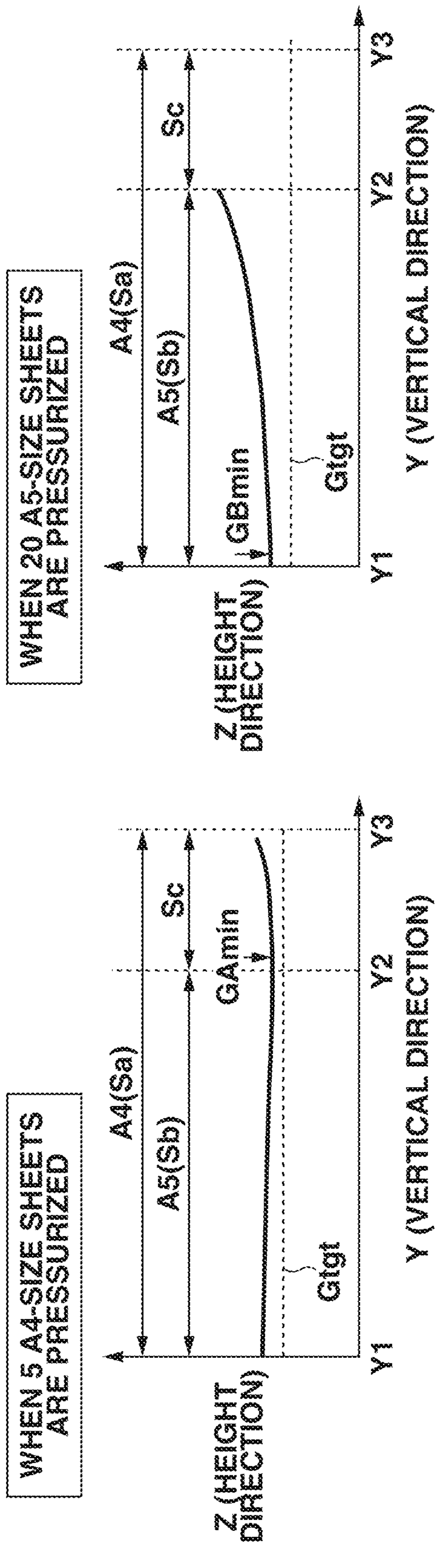

FIG. 11C illustrates the pressurization force distribution in the Y-direction when the five A4-size sheets and the 20 A5-size sheets are pressurized using the heating pressurization unit 167 according to the present embodiment. The pressurization force distribution is measured by sandwiching pressure measurement film "Prescale (product name)" manufactured by Fujifilm Corporation when the heating pressurization unit 167 pressurizes the sheets. Consequently, the pressure measurement film produces a color according to the applied pressure, and the surface pressure distribution can be visualized. If a bundle of sheets in the heating pressurization unit 167 is thin, the cushion effect of the bundle of sheets like an elastic body decreases. As a result, the bundle of sheets is likely to be influenced by a bilateral difference in pressurization force due to the shapes of the pressurization method, the pressurization member, and the reception member of the heating pressurization unit 167. Although in the present embodiment, five A4-size sheets are used to reduce this bilateral difference, two A4-size sheets may be evaluated as a stricter experimental condition. On the other hand, the reason for using 20 A5-size sheets is that the thicker the bundle of sheets is, the greater the action of the rotational moment M1 is, and the more likely a bilateral difference is to occur in the pressurization force distribution in the longitudinal direction, the more easily the effect of the action of making the pressure uniform by the slope between the thicknesses $H_{Y1}$ and $H_{Y2}$ according to the present embodiment is confirmed. The pressurization force distribution in FIG. 11C is the result of quantifying the film that has produced a color based on a standard density conversion table. FIG. 11C illustrates a reference surface pressure Gtgt (0.4 MPa) necessary for the heating pressurization unit 167 according to the present embodiment to secure an adhesive force. In the pressurization force distribution of the A5-size sheets, the surface pressure has an inclination from the point Y1 to the point Y2 in the Y-direction under the influence of the rotational moment M1, but a minimum value GBmin of the surface pressure exceeds the reference surface pressure Gtgt. In the pressurization force distribution of the A4-size sheets, the heating pressurization unit 167 is hardly influenced by the rotational moment M1 and can form an approximately uniform pressure distribution from the point Y1 to the point Y3 in the Y-direction. In a region near the point Y2 and between the points Y2 and Y3 (the position of an end portion of the second region in the third region or adjacent to the third region), a minimum value GAmin of the pressure applied to the sheets occurs, but exceeds the reference surface pressure Gtgt. This is the result of excellently adjusting the pressurization force distribution in the Y-direction in different sheet sizes by appropriately adjusting the thickness of the reception plate supporting portion 182*b* taking into account the influences of the rotational moment M1 and the flexion of the heating pressurization unit 167. In the present embodiment, by appropriately adjusting the thickness of the reception plate supporting portion 182*b* of the reception plate supporting body 182, it is possible to prevent a bias in the pressurization force distribution when the A5-size sheets are pressurized, while excellently maintaining the pressurization force distribution of the A4-size sheets. In the present embodiment, due to the state where $HY_3>H_{Y2}$, a pressure greater than the minimum value GAmin is present on the right side in FIG. 11C.

Figure 12A:
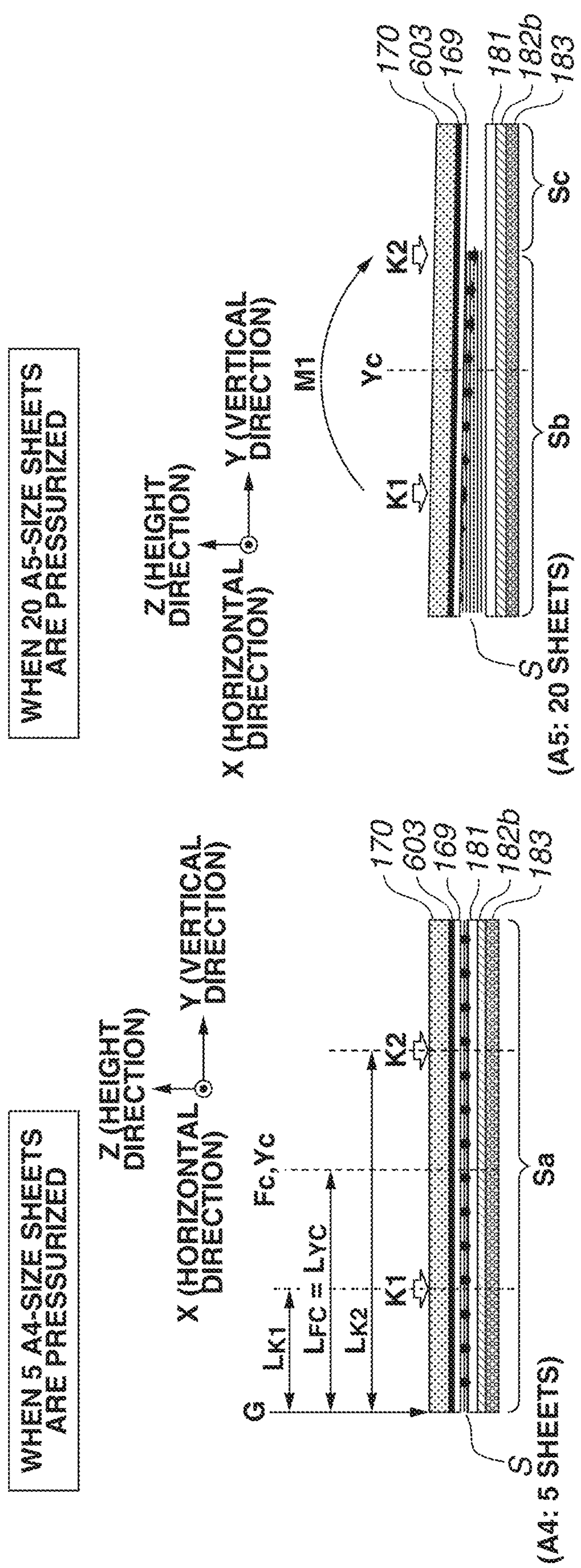
FIGS. 12A to 12C are diagrams illustrating a pressurization state of a heating pressurization unit according to comparative example 1.
Figure 12B:
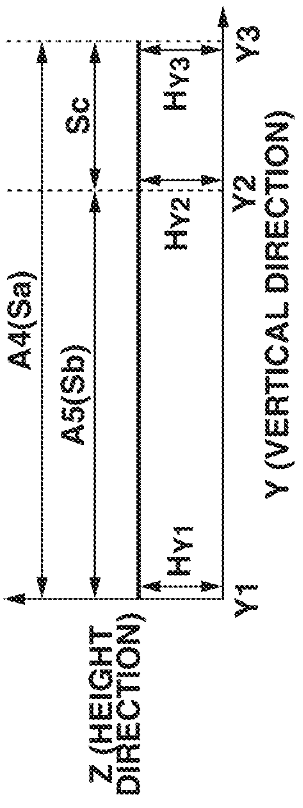
Figure 12C:
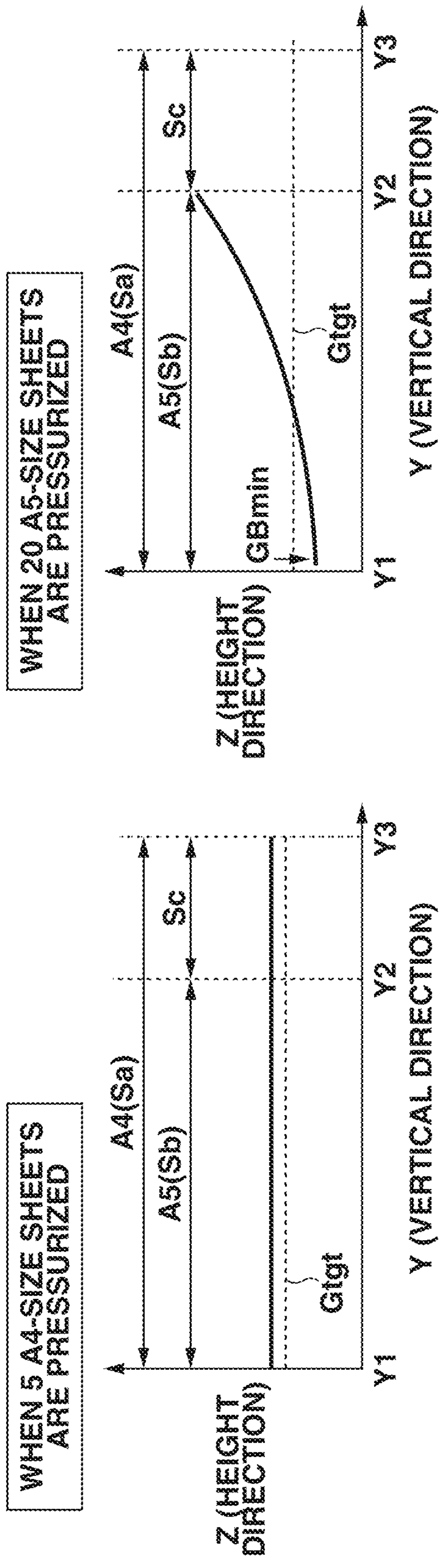

FIG. 12A is a schematic diagram in the cross section X1-X1' when five A4-size sheets and 20 A5-size sheets are pressurized using the heating pressurization unit 167 according to comparative example 1 of the present embodiment. In comparative example 1, the thickness of the reception plate supporting portion 182*b* is uniform in the Y-direction in the cross section X1-X1' ($H_{Y1}=H_{Y2}=H_{Y3}=2.5$ mm, see FIG. 12B). The pressurization positions of the pressurization forces K1 and K2 are the same as those in the present embodiment. Thus, when the A5-size sheets are pressurized, the rotational moment M1 acts with the guide shaft 173 (FIG. 9) as the fulcrum, similarly to the present embodiment. As a result, as illustrated in FIG. 12C, in the pressurization force distribution in the longitudinal direction, a great bilateral difference in pressurization force occurs in the range of the A5 width Sb. Moreover, while the pressurization force on the Y2 side is high, the minimum value GBmin of the surface pressure on the Y1 side is low and falls below the reference surface pressure Gtgt. On the other hand, the pressurization force distribution of the A4-size sheets is uniform, and the minimum value GBmin of the surface pressure exceeds the reference surface pressure Gtgt.

Figure 13A:
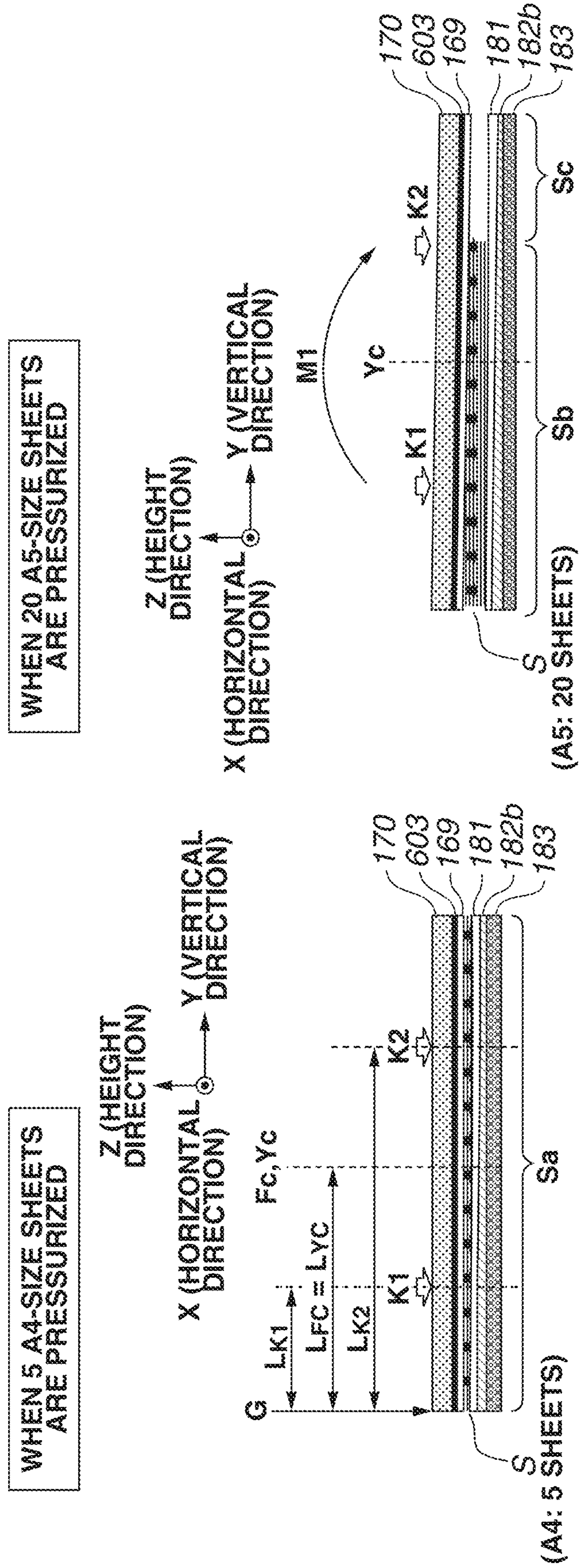
FIGS. 13A to 13C are diagrams illustrating a pressurization state of a heating pressurization unit according to comparative example 2.
Figure 13B:
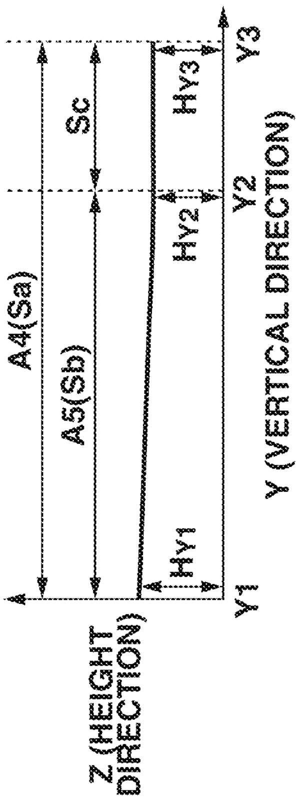

FIG. 13A is a schematic diagram in the cross section X1-X1' when five A4-size sheets and 20 A5-size sheets are pressurized using the heating pressurization unit 167 according to comparative example 2 of the present embodiment. In comparative example 2, the thickness of the reception plate supporting portion 182*b* is in a relationship where the thickness Hy at the point Y1 corresponding to the vertical alignment reference position G is greater than the thickness $H_{Y2}$ at the point Y2 ($H_{Y1}>H_{Y2}$) in both end portions of the sheet width Sb of the A5-size sheets in the cross section X1-X1'.

Figure 13C:
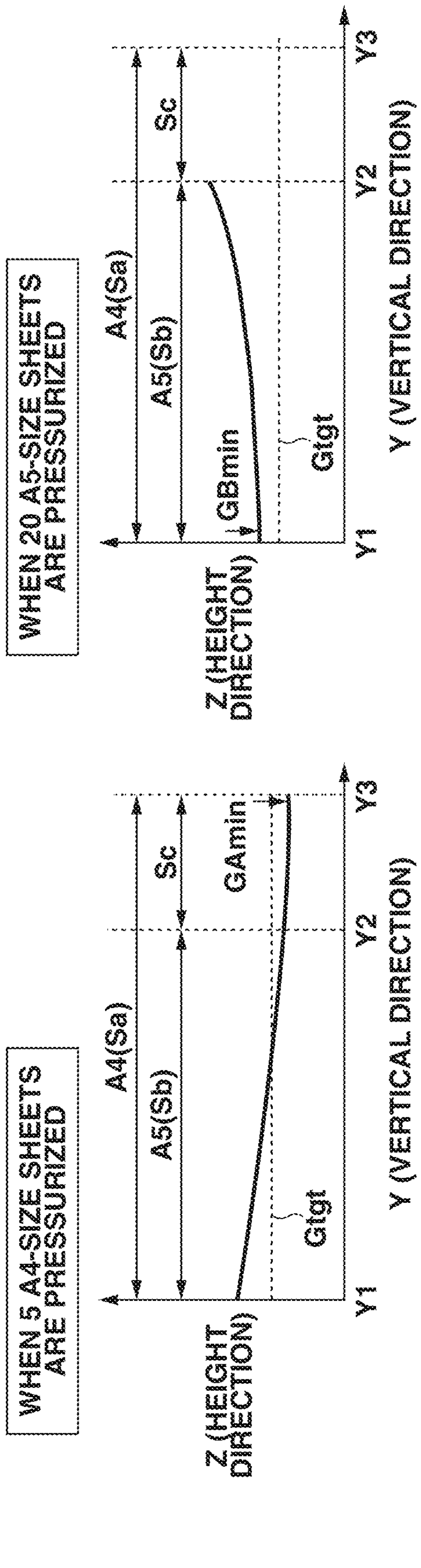

On the other hand, the thickness of the reception plate supporting portion 182*b* is in a relationship where the thickness $H_{Y2}$ at the point Y2 is the same as the thickness $H_{Y3}$ at the point Y3 ($H_{Y2}=H_{Y3}$). On the slope between the thicknesses $H_{Y1}$ and $H_{Y2}$, a smooth curved surface shape is formed. Similarly to the present embodiment, the slope between the thicknesses $H_{Y1}$ and $H_{Y2}$ ($H_{Y1}>H_{Y2}$) can increase the pressurization force on the Y1 side and decrease the pressurization force on the Y2 side, and therefore can prevent the concentration of the pressurization force on the Y2 side that occurs due to the rotational moment M1 when the A5-size sheets are pressurized. On the other hand, the thickness of the reception plate supporting portion 182*b* does not have a slope between the thicknesses $H_{Y2}$ and $H_{Y3}$ ($H_{Y2}=H_{Y3}$), and therefore, when a bilateral difference in pressurization force occurs under the influence of the slope between the thicknesses $H_{Y1}$ and $H_{Y2}$ ($H_{Y1}>H_{Y2}$) the A4-size sheets are pressurized. As a result, similarly to the present embodiment, in the pressurization force distribution of the A5-size sheets in FIG. 13C, in the range of the sheet width Sb of the A5 width, the surface pressure has an inclination from the point Y1 to the point Y2 in the Y-direction under the influence of the rotational moment M1, but the minimum value GBmin of the surface pressure exceeds the reference surface pressure Gtgt. On the other hand, in the pressurization force distribution of the A4-size sheets, in the range of the sheet width Sa of the A4 width, a bilateral difference occurs in the pressurization force distribution under the influence of the slope ($H_{Y1}>H_{Y2}$) of the thickness of the reception plate supporting portion 182*b*. Thus, the pressurization force on the Y1 side is high, whereas the pressurization force on the Y3 side is low. As a result, the minimum value GAmin of the pressure applied to the sheets falls below the reference surface pressure Gtgt on the Y3 side.

To verify the effects of the present embodiment, booklets according to the present embodiment and comparative examples 1 and 2 are created, and the adhesive strengths of adhesion portions are compared with each other. First, a booklet quality test method for the booklet adhesive strength is described. First, a booklet is produced by the image forming apparatus 101 and the heating pressurization unit 167. At this time, under test conditions, in the case of a booklet of the A4 size, a booklet of a bundle of five sheets is created. In the case of a booklet of the A5 size, a booklet of a bundle of 20 sheets is created. A bonding process on a bundle of sheets by the heating pressurization unit 167 is collectively performed on every five sheets. In the current booklet adhesive strength test, A4-size GF-C081 manufactured by Canon Inc. is used as sheets S.

Figure 14A:
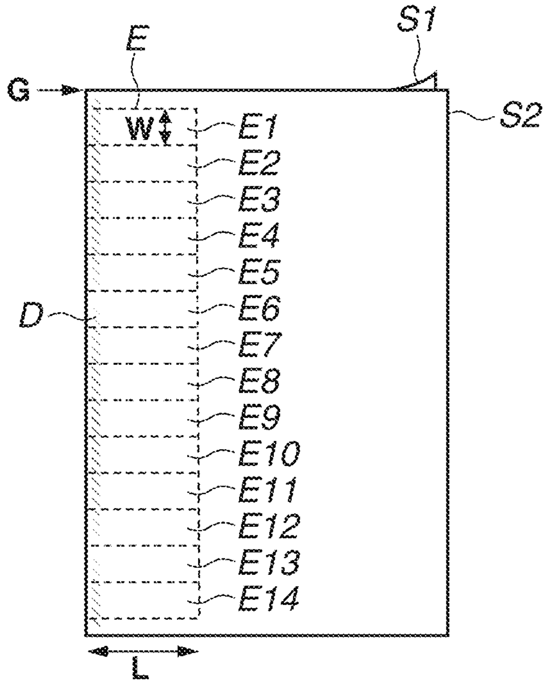
FIGS. 14A to 14C are schematic diagrams illustrating a test method for a booklet adhesive strength.
Figure 14C:
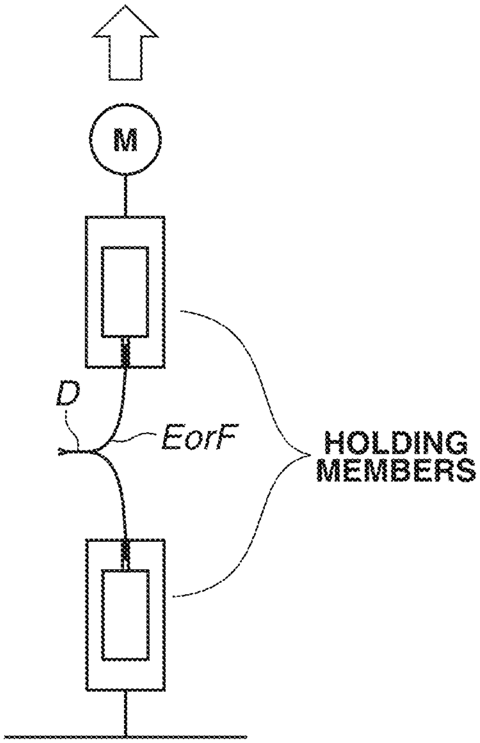
Figure 14B:
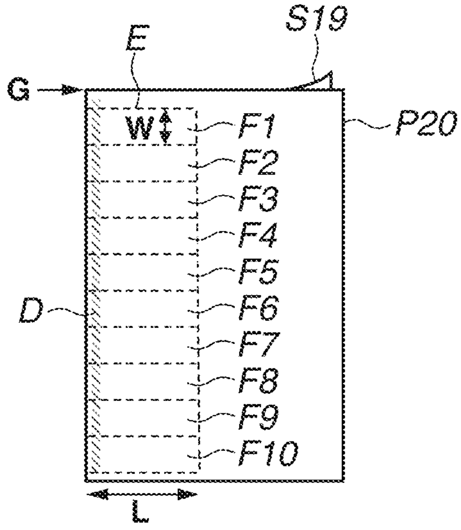

In an experiment where the sheet size is A5, influences other than that of the sheet size are eliminated by cutting the A4-size GF-C081 in half and using the cut A4-size GF-C081, and comparisons are made. Next, a method for creating test pieces for performing a quality test on the booklet adhesive strength from a produced booklet is described. In FIG. 14A, a test piece E is created from a booklet of two A4-size sheets. In FIG. 14B, a test piece F is created from a booklet of two A5-size sheets. In the case of the A4 size, sheets S3 to S5 corresponding to third to fifth pages are peeled off and removed from a created booklet of a bundle of five sheets, thereby obtaining a booklet of two sheets in which only sheets S1 and S2 are bonded. In the case of the A5 size, sheets S1 to S18 corresponding to first to eighteenth pages are peeled off and removed from a created booklet of a bundle of 20 sheets, thereby obtaining a booklet of two sheets in which only sheets S19 and S20 are bonded. Then, in the case of the A4-size sheets, as illustrated in FIG. 14A, the booklet is cut out to dimensions including a width (W) of 20 mm and a length (L) of 50 mm, whereby a test piece E of the A4-size sheets including a adhesion portion D is created. At this time, as the test piece E, test pieces E1 to E14 are created in order from the vertical alignment reference position G. Similarly, in the case of the A5-size sheets, as illustrated in FIG. 14B, the booklet is cut out to dimensions including a width (W) of 20 mm and a length (L) of 50 mm, whereby a test piece F of the A5-size sheets including a adhesion portion D is created. At this time, as the test piece F, test pieces F1 to F10 are created in order from the vertical alignment reference position G. Next, as illustrated in FIG. 14C, one of the sheet pieces of the test piece E or F is held by an upper holding member, and the other sheet piece is held by a lower holding member. To the upper holding member, Digital Force Gauge M (FGP-2 manufactured by Nidec Shimpo Corporation) is further connected. Then, the Digital Force Gauge is gradually pulled upward, the peeling force when the adhesion portion D peels is measured by the Digital Force Gauge, and the peak value of the peeling force is recorded. The measurement is made five times with respect to each test piece, and the average value of the peeling force is determined as the booklet adhesive strength of the adhesion portion D. According to the consideration of the present inventors, it is confirmed that in actual use, it is desirable that the adhesive strength of a booklet is to be 1.0 N/cm or more per unit distance in the width direction of a test piece. Thus, as a quality standard, if the adhesive strength is greater than or equal to 1.0 N/cm, the booklet strength is determined as "pass". If the adhesive strength is less than 1.0 N/cm, the booklet strength is determined as "fail". The reason for measuring the adhesive strength between the sheets S1 and S2 among the A4-size sheets is that in the A4-size sheets, the booklet is thin and likely to be influenced by the adhesive strength due to the pressurization force distribution of the heating pressurization unit 167 in a portion close to the reception plate 181. The reason for measuring the adhesive strength between the sheets S19 and S20 among the A5-size sheets is that in the A5-size sheets, if the booklet has a certain thickness, the heating pressurization unit 167 is likely to be influenced by the rotational moment M1.

Figure 15A:
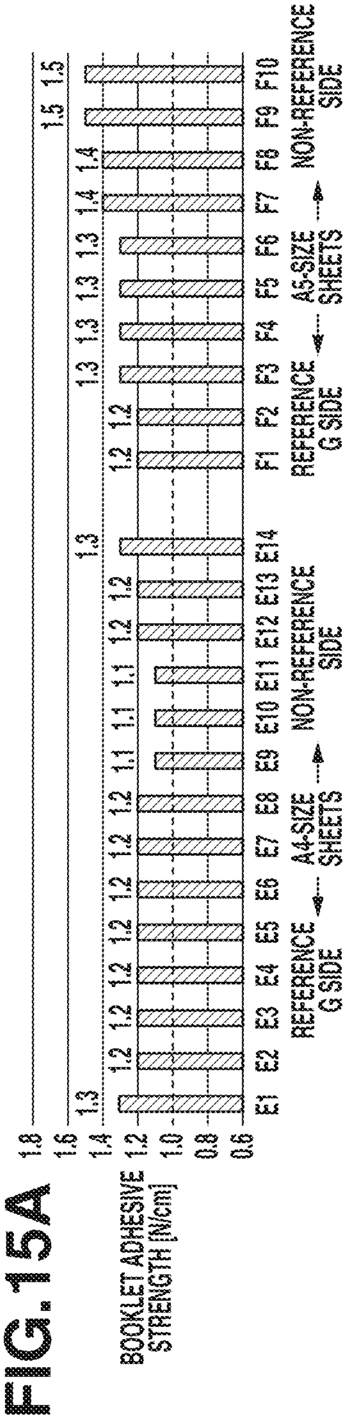
FIGS. 15A to 15F illustrate test results of the booklet adhesive strength.
Figure 15B:
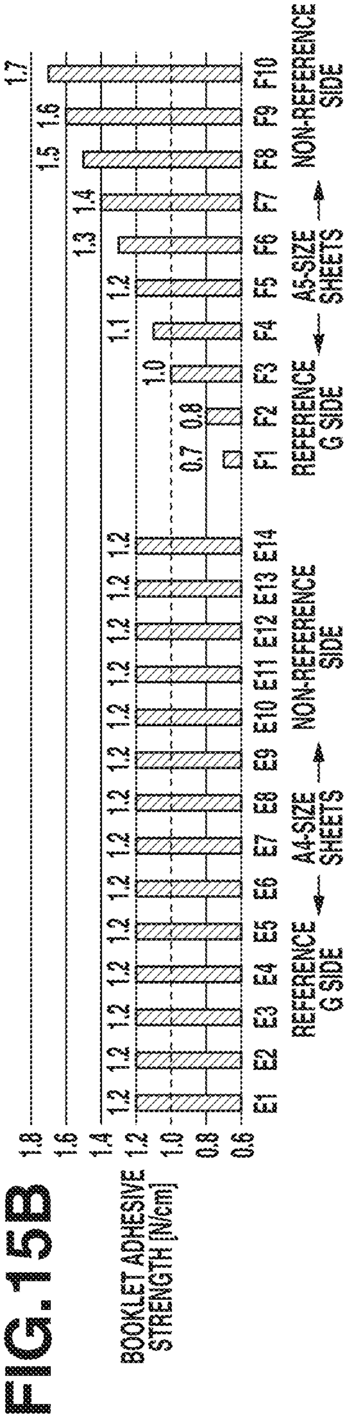
Figure 15C:
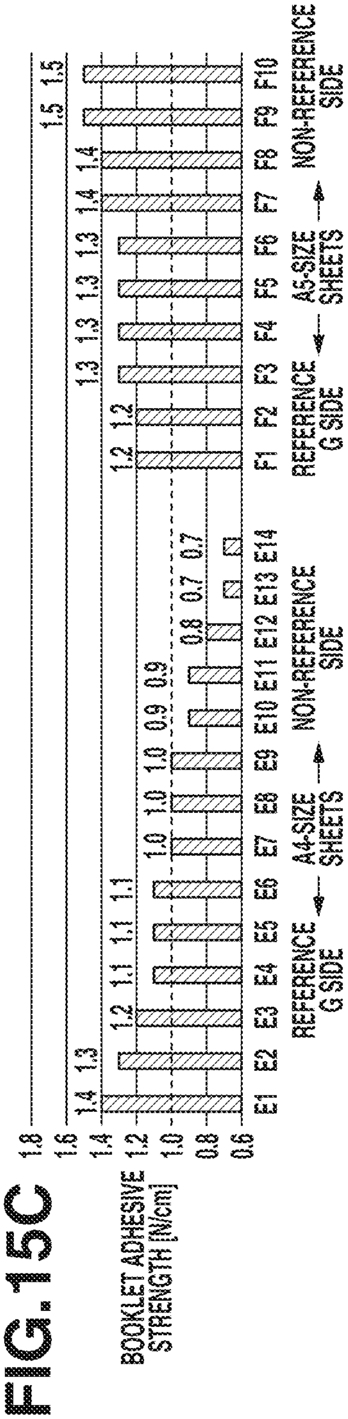

FIGS. 15A to 15C illustrate the test results of the booklet adhesive strength according to the present embodiment and comparative examples 1 and 2. FIG. 15A illustrates the booklet adhesive strength according to the present embodiment. It is understood that both the A4-size sheets (E1 to E14) and the A5-size sheets (F1 to F10) exceed the reference adhesive strength of 1.0 N/cm and obtain a sufficient adhesive strength in each adhesion portion. Specifically, the A5-size sheets are influenced by the rotational moment M1, but exceed the reference adhesive strength of 1.0 N/cm even in the test pieces F1 and F2 on the vertical alignment reference position G side by appropriately forming the thickness of the reception plate supporting portion 182*b*. Also in the A4-size sheets, since the thickness of the reception plate supporting portion 182*b* is appropriately formed, the A4-size sheets exceed the reference adhesive strength of 1.0 N/cm even in the test pieces E9 to E11 in which the thickness of the reception plate supporting portion 182*b* is small. FIG. 15B illustrates the booklet adhesive strength according to comparative example 1. The A4-size sheets obtain an excellent adhesive force in the test pieces E1 to E14, but the A5-size sheets do not reach the reference adhesive strength of 1.0 N/cm in the test pieces F1 and F2 on the vertical alignment reference position G side. It is considered that this is because the A5-size sheets are influenced by a bilateral difference in the pressurization force distribution that occurs due to the rotational moment M1 of the heating pressurization unit 167. In an end portion on the vertical alignment reference position G side corresponding to the test pieces F1 and F2, the pressurization force does not reach the reference surface pressure Gtgt, and therefore, the pressurization force is insufficient, and the adhesiveness between the sheets is not sufficiently obtained. As a result, the test pieces F1 and F2 do not reach the reference adhesive strength. FIG. 15C illustrates a booklet adhesive strength according to comparative example 2. It is understood that, similarly to the present embodiment, the A5-size sheets exceed the reference adhesive strength of 1.0 N/cm and obtain a sufficient adhesive strength. Specifically, in the pressurization of the A5-size sheets, the A5-size sheets are influenced by the rotational moment M1, but exceed the reference adhesive strength of 1.0 N/cm even in the test pieces F1 and F2 on the vertical alignment reference position G side by changing the thickness of the reception plate supporting portion 182*b* only in the pressurization region of the A5 sheets. On the other hand, the A4-size sheets fall below the reference adhesive strength of 1.0 N/cm in the test pieces E12 to E14 on the non-reference side. It is considered that this is because a bilateral difference occurs in the pressurization force distribution under the influence of the slope ($H_{Y1}>H_{Y2}$) of the thickness of the reception plate supporting portion 182*b*, and the pressurization force on the Y1 side is high, whereas the pressurization force on the Y3 side is low.

Table 1 illustrates a list of the results of the comparative verification of the present embodiment and comparative examples 1 and 2. The measurement results of "(M) pressurization force distribution" and the measurement results of "(N) booklet adhesive force" illustrated in table 1 are obtained by aggregating the contents and the verification results described above with reference to FIGS. 11A to 11C to FIGS. 13A to 13C and FIGS. 15A to 15C. Table 1 is described below.

TABLE 1

Results of Comparative Verification of First Embodiment and Comparative Examples 1 and 2

| | (J1) Present Embodiment | | (H3) Comparative Example 1 | | (H3) Comparative Example 2 | |
|---|---|---|---|---|---|---|
| (L) Shape of Reception Plate Supporting Portion | (L-J1) Slopes present on both sides $H_{Y1} > H_{Y2}$, $H_{Y3} > H_{Y2}$ | | (L-H1) Slope absent $H_{Y1} = H_{Y2} = H_{Y3}$ | | (L-H2) Slope present on one side $H_{Y1} > H_{Y2}$, $H_{Y2} = H_{Y3}$ | |
| | When A4 sheets are pressurized | When A5 sheets are pressurized | When A4 sheets are pressurized | When A5 sheets are pressurized | When A4 sheets are pressurized | When A5 sheets are pressurized |
| (M) Pressurization Force Distribution Reference Value: 0.4 Mpa | (M-J1-1) Pressurization force: pass 0.60-0.80 MPa | (M-J1-2) Pressurization force: pass 0.70-0.90 MPa | (M-H1-1) Pressurization force: pass 0.55 MPa | (M-H1-2) Pressurization force: fail 0.30-1.00 MPa | (M-H2-1) Pressurization force: fail 0.30-0.70 MPa | (M-H2-2) Pressurization force: fail 0.70-0.90 MPa |
| (N) Booklet Adhesive Force Reference Value: 1.0 N/cm | (N-J1-1) Adhesive force: pass 1.1-1.3 N/cm | (N-J1-2) Adhesive force: pass 1.2-1.5 N/cm | (N-H1-1) Adhesive force: pass 1.2 N/cm | (N-H1-2) Adhesive force: fail 0.7-1.7 N/cm | (N-H2-1) Adhesive force: fail 0.7-1.4 N/cm | (N-H2-2) Adhesive force: pass 1.2-1.5 N/cm |

(L) Shape of Reception Plate Supporting Portion

In the present embodiment, the thickness ($H_{Y1}$, $H_{Y2}$, and $H_{Y3}$) of the reception plate supporting portion 182b has a feature (FIG. 11B). The thickness at the point Y1 corresponding to the vertical alignment reference position G is $H_{Y1}$, the thickness corresponding to the end portion point on the non-reference side of the sheet width Sb of the A5-size sheets is $H_{Y2}$, and the thickness corresponding to the end portion point on the non-reference side of the sheet width Sa of the A4-size sheets is $H_{Y3}$. A configuration is employed in which the shape of the reception plate supporting portion (L-J1) according to the present embodiment has slopes on both sides in the Y-direction with the end portion $H_{Y2}$ in the pressurization region of the A5-size sheets as the starting point ($H_{Y1} > H_{Y2}$, $H_{Y3} > H_{Y2}$). On the other hand, a configuration is employed in which the shape of the reception plate supporting portion (L-H1) according to comparative example 1 does not have a slope based on the thickness of the reception plate supporting portion 182b ($H_{Y1} = H_{Y2} = H_{Y3}$). Further, a configuration is employed in which the shape of the reception plate supporting portion (L-H2) according to comparative example 2 has a slope on one side (the reference side) in the Y-direction with the end portion $H_{Y2}$ of the pressurization region of the A5-size sheets as the starting point ($H_{Y1} > H_{Y2}$, $H_{Y2} = H_{Y3}$).

(M) Pressurization Force Distribution of Heating Pressurization Unit

In the present embodiment, both in the A4-size sheets and the A5-size sheets, the pressurization force can be maintained to be greater than or equal to a reference value (0.4 MPa) (M-J1-1 and M-J1-2). On the other hand, according to comparative examples 1 and 2, portions where the pressurization force falls below the reference value (0.4 MPa) occur (M-H1-2 and M-H2-1).

(N) Booklet Adhesive Strength

In the present embodiment, both in the A4-size sheets and the A5-size sheets, the booklet adhesive force can be greater than or equal to the reference value (1.0 N/cm) (N-J1-1 and N-J1-2). On the other hand, according to comparative examples 1 and 2, there are portions where the booklet adhesive force cannot be greater than or equal to the reference value (1.0 N/cm) (N-H1-2 and N-H2-1).

As described above, by appropriately adjusting the thickness of the reception plate supporting portion 182*b* in the heating pressurization unit 167 compatible with a plurality of sheet sizes, it is possible to reduce a bilateral difference in the pressurization force distribution without using a complex mechanism that individually operates with respect to each sheet size.

As a result, it is possible to exert an excellent adhesive force without making an apparatus large or significantly increasing the cost. Although in the present embodiment, the pressurization force distribution of the heating pressurization unit 167 is achieved by changing the thickness of the reception plate supporting portion 182*b* in the Y-direction, the present invention is not limited to this. Alternatively, for example, the pressurization force distribution of the heating pressurization unit 167 may be achieved by changing the thickness of the reception plate 181 in the Y-direction. Yet alternatively, the pressurization force distribution of the heating pressurization unit 167 may be achieved by changing the thickness of the pressurization plate 169, which is a part of the heating pressurization unit 167, in the Y-direction.

In the present embodiment, a description has been given of the configuration in which the heating pressurization unit 167 can swing about the guide shaft 173 capable of moving up and down. However, for example, also in a configuration in which the heating pressurization unit 167 cannot swing, there is a possibility that a pressurization member is slightly tilted by pressurizing small-size sheets, and a bilateral difference in the Y-direction occurs in the pressurization force distribution. Also in such a case, as described in the present embodiment, it is possible to appropriately adjust the pressurization force distribution by appropriately adjusting the thickness of the reception plate supporting portion 182*b*.

Figure 16A:
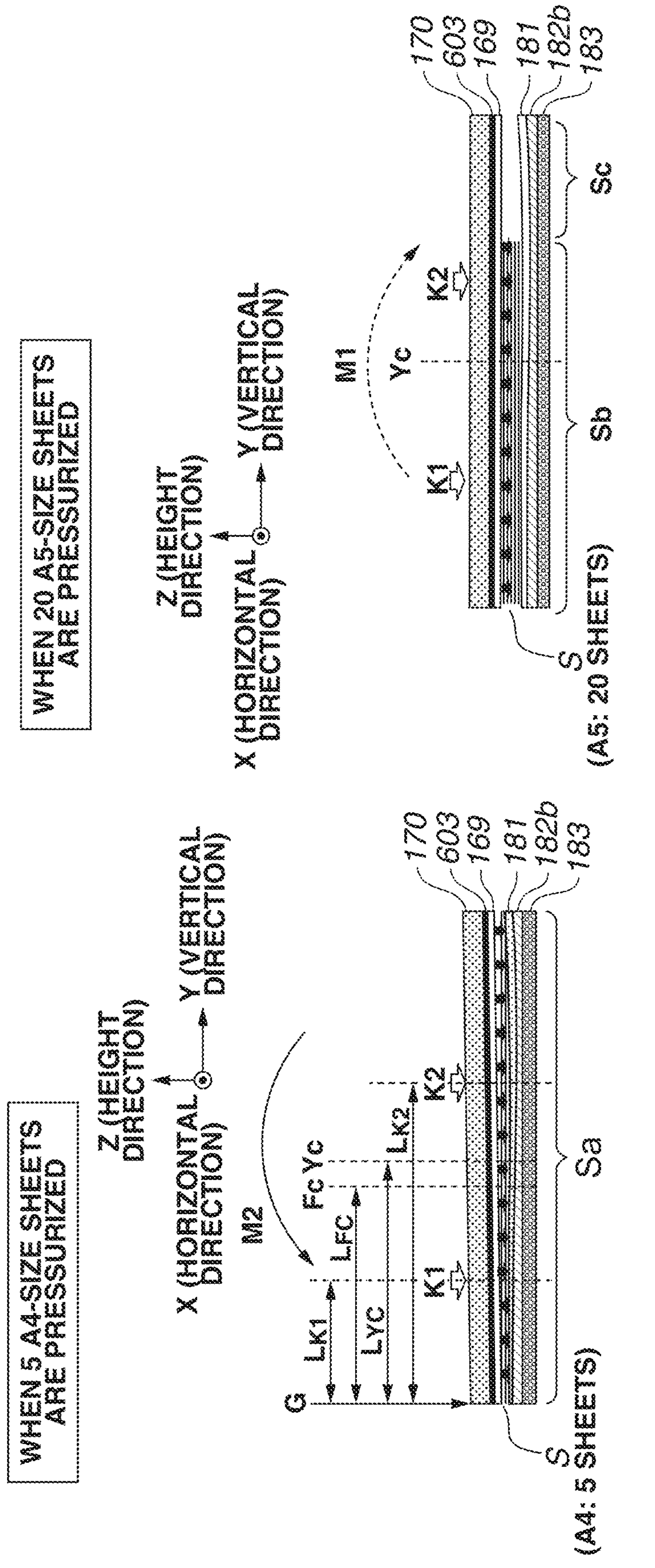
FIGS. 16A to 16C are diagrams illustrating a pressurization state of a heating pressurization unit according to a second embodiment.

A second embodiment is different from the first embodiment in the position where the pressurization forces of the lift plate 172 are applied to the metal stay 170 in the heating pressurization unit 167, and in the thickness of the reception plate supporting portion 182*b*. These differences are described in detail. Descriptions redundant with the first embodiment are omitted. FIG. 16A is a schematic diagram in the cross section X1-X1' when five A4-size sheets and 20 A5-size sheets are pressurized using the heating pressurization unit 167 according to the present embodiment.

Figure 16B:
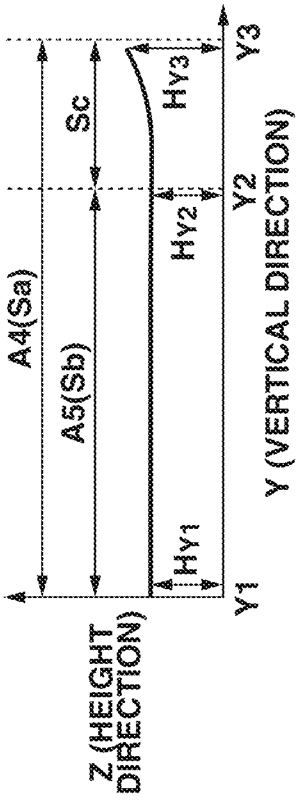

In the first embodiment, the position of the pressurization center Fc is the same as the center position Yc in the Y-direction of the heating pressurization unit 167, whereas in the present embodiment, the position of the pressurization center Fc is closer to the vertical alignment reference position G side than the center position Yc in the Y-direction of the heating pressurization unit 167. The pressurization center Fc is closer to the vertical alignment reference position G side than the center Yc of the heating pressurization unit 167, thereby causing a rotational moment M2 opposite to the rotational moment M1 in the first embodiment to act. As a result, it is possible to weaken the action of the rotational moment M1 when the A5-size sheets are pressurized due to the non-pressurization region Sc described in the first embodiment. As the specific positional relationship between the pressurization forces, the position of the pressurization force K2 moves by 25 mm ($L_{K2}$ (200 mm)) to the vertical alignment reference position G side. As a result of the movement of the pressurization force K2, the pressurization center Fc of the pressurization forces K1 and K2 moves (shifts) closer to the vertical alignment reference position G by 12 mm from the center position Yc in the Y-direction (the distance $L_{Yc}$: 150 mm). The distance $L_{Fc}$ from the vertical alignment reference position G to the pressurization center Fc is 138 mm. FIG. 16B illustrates the thickness of the reception plate supporting portion 182*b* in the cross section X1-X1'.

Figure 15D:
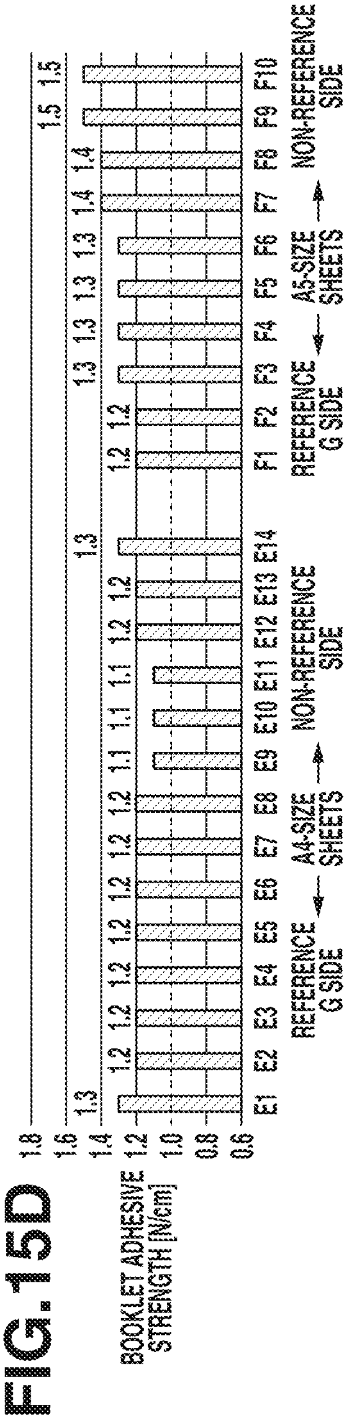
Figure 16C:
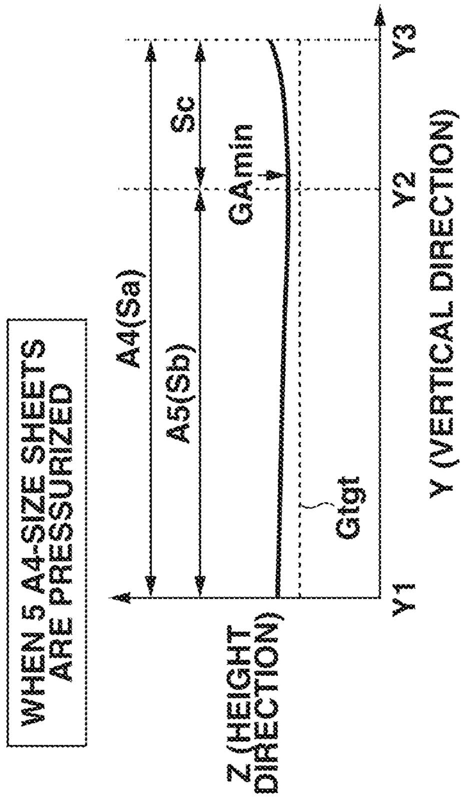
Figure 16C:
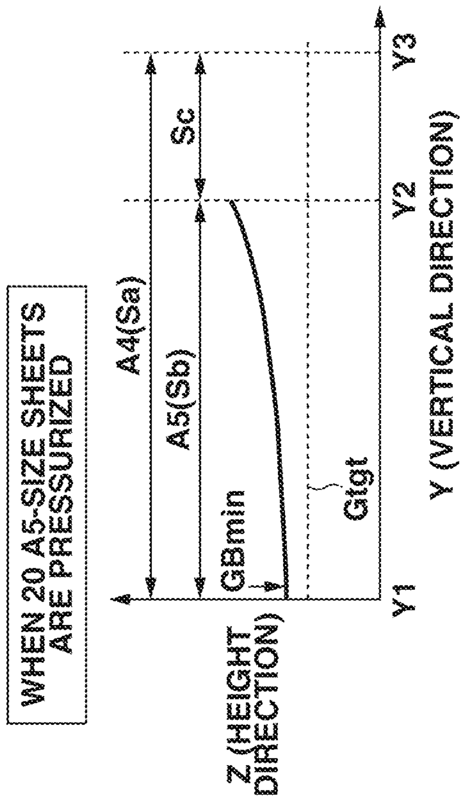

The thickness $H_{Y3}$ at the point Y3 in the end portion of the sheet width Sa of the A4-size sheets is the greatest, and the thickness $H_{Y1}$ at the point Y1 corresponding to the vertical alignment reference position G and the thickness $H_{Y2}$ at the point Y2 in the end portion of the sheet width Sb of the A5-size sheets are the same thickness ($H_{Y3}>H_{Y2}$, $H_{Y1}=H_{Y2}$). In the present embodiment, $HY_1$ is 2.3 mm, $HY_2$ is 2.3 mm, and $HY_3$ is 2.6 mm. On the slope between the thicknesses $H_{Y2}$ and $H_{Y3}$, a smooth curved surface shape is formed. This is because the slope between the thicknesses $H_{Y2}$ and $H_{Y3}$ can increase the pressurization force on the Y3 side, and therefore, the thickness of the reception plate supporting portion 182*b* is appropriately adjusted taking into account the rotational moment M2 and the flexion of the heating pressurization unit 167 according to the present embodiment. In FIG. 16C, in the pressurization force distribution of the A4-size sheets, in a region between the points Y2 and Y3, the minimum value GAmin of the pressure applied to the sheets occurs, but exceeds the reference surface pressure Gtgt. This is because, regarding the rotational moment M2 composed of the pressurization forces K1 and K2, the thickness of the reception plate supporting portion 182*b* is appropriately adjusted taking into account the influences of the rotational moment M2 and the flexion of the heating pressurization unit 167. In the pressurization force distribution of the A5-size sheets, the surface pressure has an inclination from the point Y1 to the point Y2 in the Y-direction, but the minimum value GBmin of the surface pressure exceeds the reference surface pressure Gtgt. This is the result of maintaining a well-balanced state by moving the pressurization center Fc of the pressurization of the lift plate 172 to the metal stay 170 closer to the vertical alignment reference position G and weakening the action of the rotational moment M1 due to the non-pressurization region Sc in the present embodiment. FIG. 15D illustrates the test result of the booklet adhesive strength according to the present embodiment. The adhesive properties of the test pieces E1 to E14 in the A4-size sheets and the test pieces F1 to F10 in the A5-size sheets exceed the reference adhesive strength of 1.0 N/cm and are excellent. In the present embodiment, similarly to the first embodiment, since the surface pressure distribution is adjusted so that the surface pressure exceeds the reference surface pressure Gtgt, it is possible to obtain an excellent adhesive force. As a method for adjusting the pressurization force distribution when sheets are aligned based on one side end portion of the sheets and a plurality of sheet sizes is pressurized, a suitable method between those according to the first and second embodiments may be used according to the device configuration of the heating pressurization unit 167.

Figure 17A:
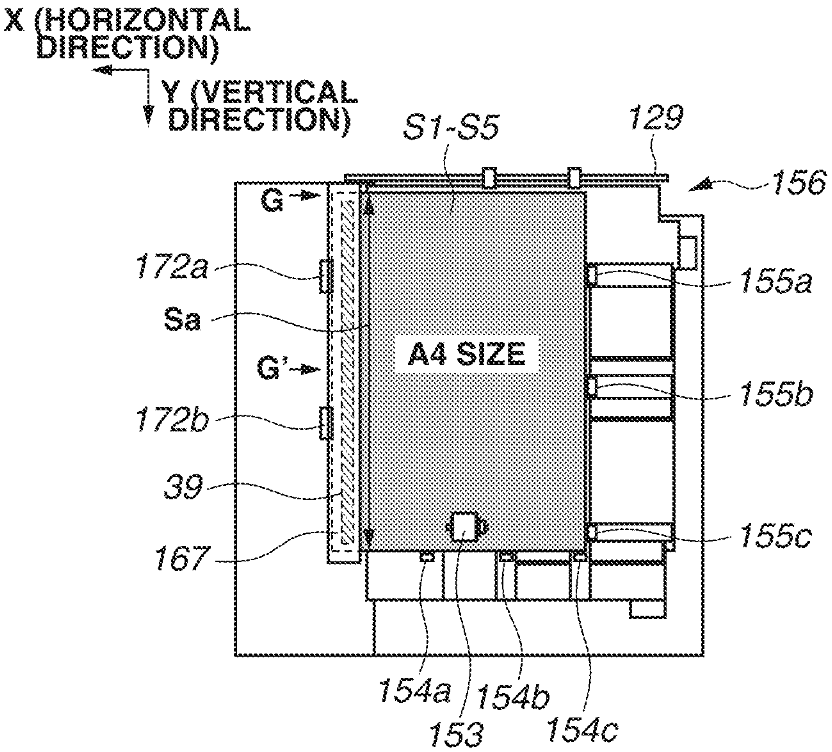
FIGS. 17A and 17B are diagrams illustrating an operation of an alignment section according to a third embodiment.
Figure 17B:
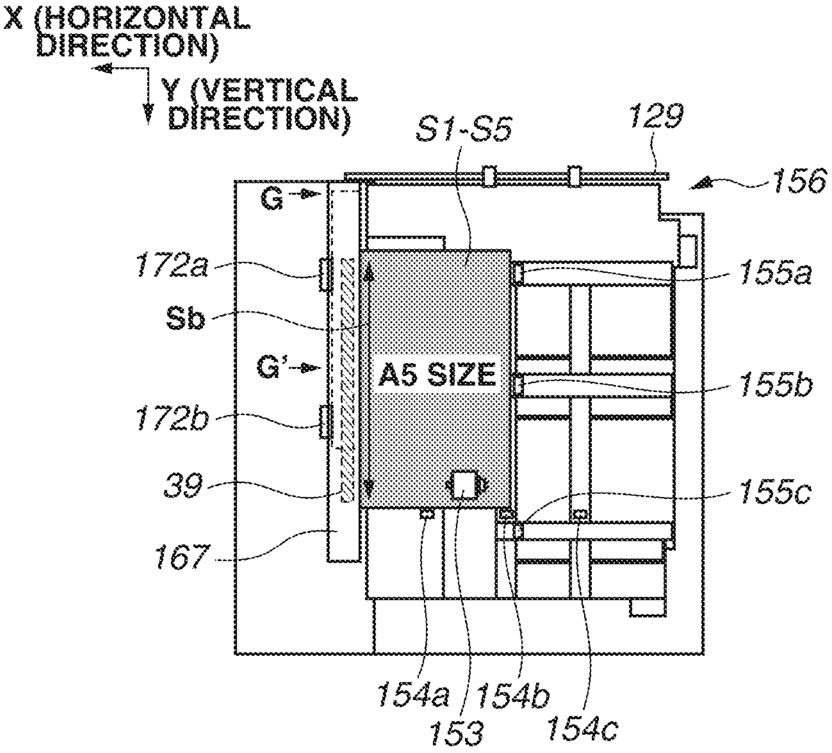
Figure 18A:
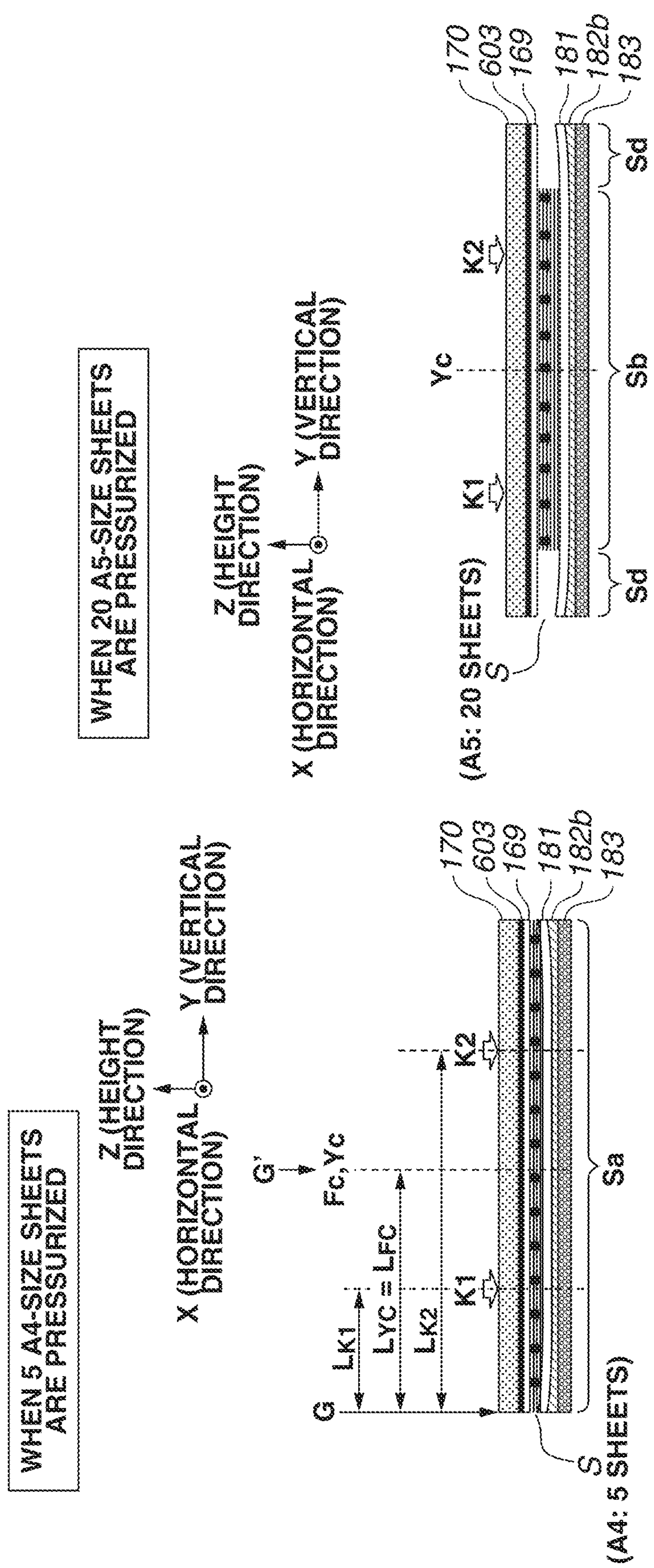
FIGS. 18A to 18C are diagrams illustrating a pressurization state of a heating pressurization unit according to the third embodiment.
Figure 18B:
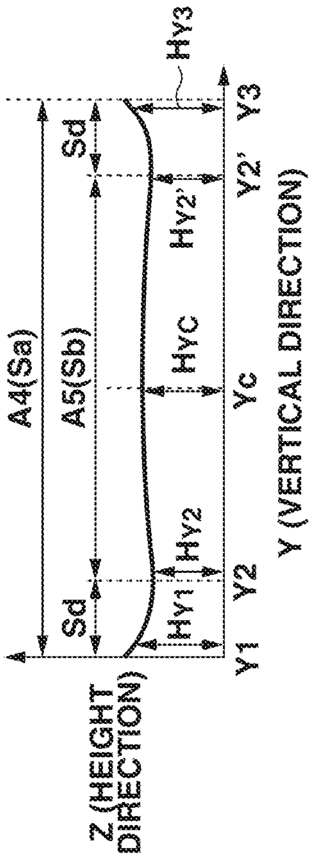
Figure 18C:
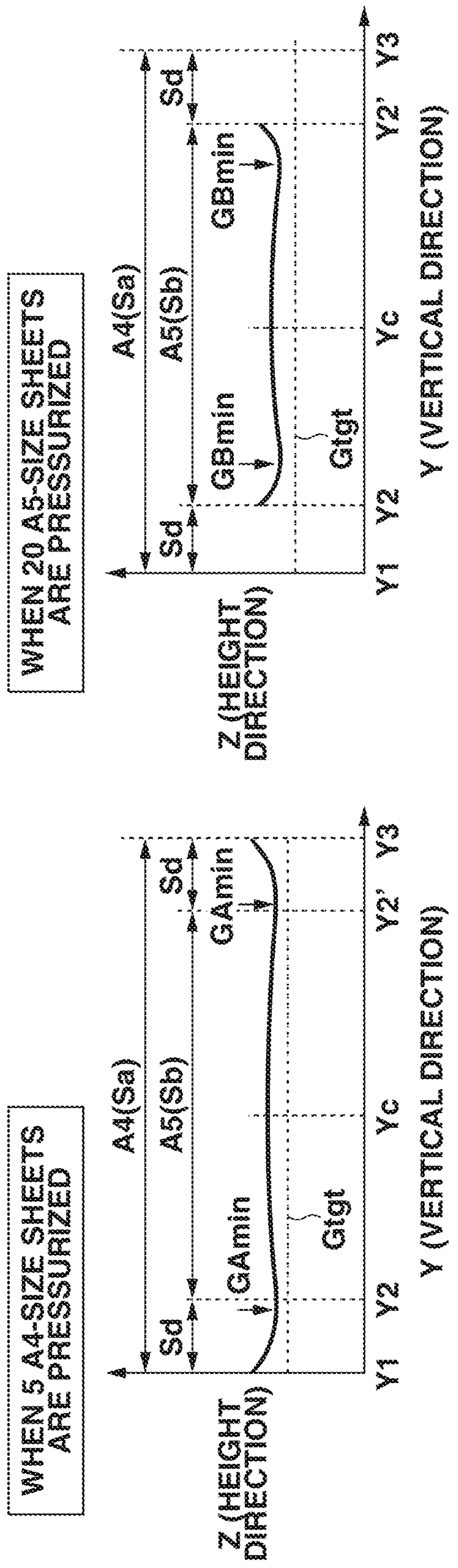

In the first and second embodiments, regarding the sheet alignment method, the one-side reference is used in which one side end portion of the sheets S is aligned to the vertical alignment reference position G of the heating pressurization unit 167. In the present embodiment, center reference is used in which a vertical alignment reference position G' of the heating pressurization unit 167 is set as illustrated in FIGS. 17A and 17B, and a center portion in the Y-direction of the sheets S is aligned. In the present embodiment, the reference position G is not used as an alignment reference position, but is used to define positions redundant with the description of the first and second embodiments. Descriptions redundant with the first embodiment are omitted. FIG. 18A is a schematic diagram in the cross section X1-X1' when five A4-size sheets and 20 A5-size sheets are pressurized using the heating pressurization unit 167 according to the present embodiment. The vertical alignment reference position G' is the same as the center position Yc in the Y-direction of the heating pressurization unit 167. FIG. 18B illustrates the thickness of the reception plate supporting portion 182*b* in the cross section X1-X1'. In the cross section X1-X1', the thickness $H_{Y2}$ and a thickness $HY_{2'}$ at the point Y2 and a point Y2', respectively, in end portions of the sheet width Sb of the A5-size sheets are the smallest, and the thicknesses $H_{Y1}$ and $H_{Y3}$ corresponding to the points Y1 and Y3, respectively, in both end portions of the sheet width Sa of the A4-size sheets are greater than the thicknesses $HY_2$ and $HY_{2'}$ ($H_{Y1}>H_{Y2}$, $H_{Y3}>H_{Y2'}$). A thickness $H_{Yc}$ corresponding to the center position Yc in the Y-direction of the heating pressurization unit 167 is also greater than the thicknesses $H_{Y2}$ and $H_{Y2'}$ ($H_{Yc}>H_{Y2}$, $HY_c>H_{Y2'}$). In the present embodiment, $HY_1$ is 2.5 mm, $HY_2$ is 2.3 mm, $HY_c$ is 2.4 mm, $HY_{2'}$ is 2.3 mm, and $HY_3$ is 2.5 mm. In all the slopes between the thicknesses $H_{Y1}$ to $H_{Y3}$, smooth curved surface shapes are formed. As illustrated in FIG. 18B, when the A5-size sheets are pressurized, a relationship where $HY_2<H_{Yc}$ and $HY_{2'}<H_{Yc}$ is set, whereby it is possible to increase the pressurization force to the center position Yc. As a result, as illustrated in FIG. 18C, it is possible to prevent the concentration of the pressurization force at the points Y2 and Y2' in the end portions of the sheet width Sb of the A5-size sheets. When the A4-size sheets are pressurized, a relationship where $HY_2<H_{Y1}$, $HY_{2'}<H_{Y3}$ is set, whereby it is possible to adjust the pressurization force distribution to be uniform in the Y-direction without excessively increasing the pressurization force to the center position Yc. In the pressurization force distribution of the A5-size sheets in FIG. 18C, as the surface pressure, an approximately uniform surface pressure is achieved from the point Y2 to the point Y2' in the Y-direction, and the minimum value GBmin of the surface pressure exceeds the reference surface pressure Gtgt. This is because a non-pressurization region when small-size sheets are pressurized is dispersed equally to the right and left in both side end portions of the heating pressurization unit 167 by aligning sheets S based on the center reference, whereby the action of the rotational moment M1 as in the first or second embodiment is prevented. Also in the pressurization force distribution of the A4-size sheets, an approximately uniform pressure distribution is formed from the point Y1 to the point Y3 in the Y-direction. In regions near the points Y2 and Y2' and between the points Y1 and Y2 and between the points Y2' and Y3, the minimum value GAmin of the pressure applied to the sheets occurs, but exceeds the reference surface pressure Gtgt. This is the result of excellently adjusting the pressurization force distribution in the Y-direction in different sheet sizes by appropriately adjusting the thickness of the reception plate supporting portion 182*b* taking into account the influence of the flexion of the heating pressurization unit 167. In the present embodiment, similarly to the first and second embodiments, since the surface pressure distribution is adjusted so that the surface pressure exceeds the reference surface pressure Gtgt, it is possible to obtain an excellent adhesive force.

Figure 19A:
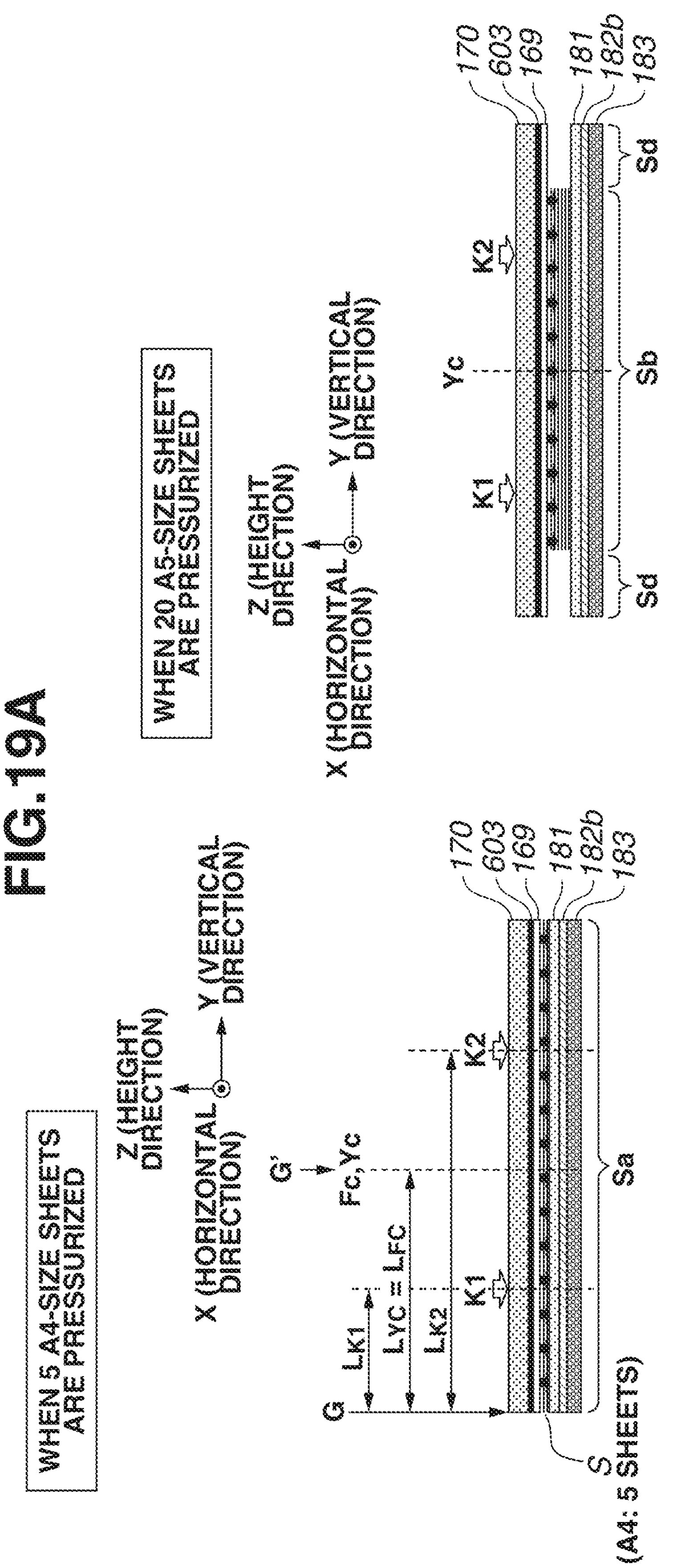
FIGS. 19A to 19C are diagrams illustrating a pressurization state of a heating pressurization unit according to comparative example 3.
Figure 19B:
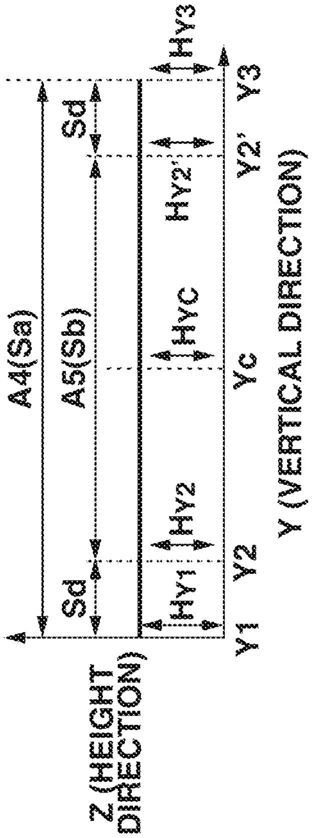
Figure 19C:
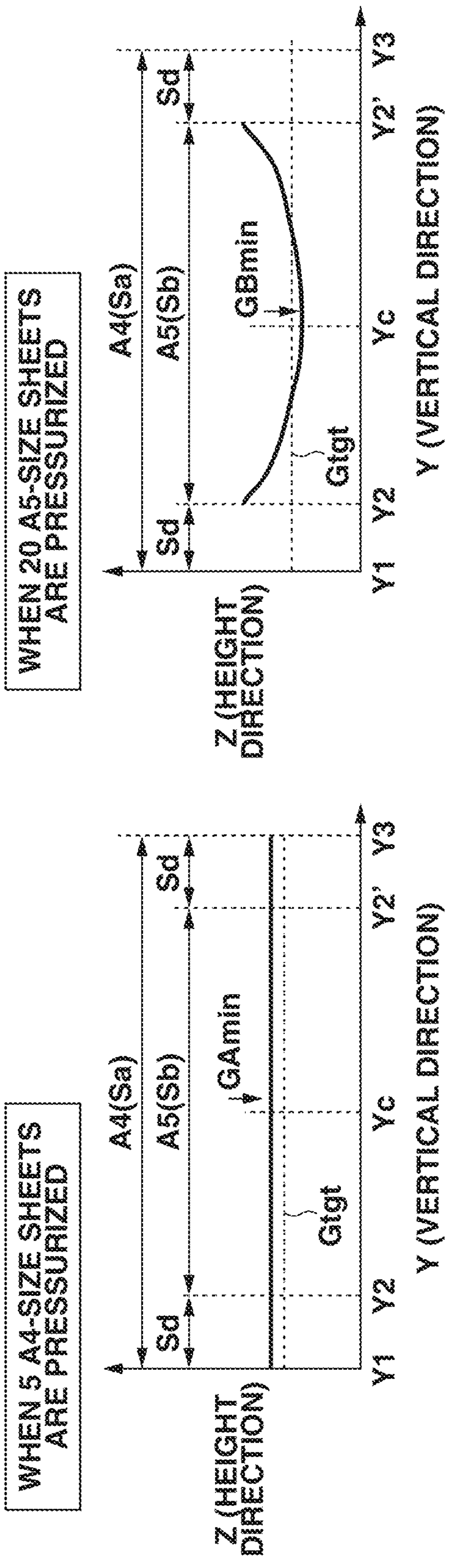

FIG. 19A is a schematic diagram in the cross section X1-X1' when five A4-size sheets and 20 A5-size sheets are pressurized using the heating pressurization unit 167 according to comparative example 3. In comparative example 3, the thickness of the reception plate supporting portion 182*b* is uniform in the Y-direction in the cross section X1-X1' ($H_{Y1}=H_{Y2}=H_{Y3}=2.5$ mm, see FIG. 19B). The pressurization positions of the pressurization forces K1 and K2 are the same as those in the present embodiment. As illustrated in FIG. 19C, when the A5-size sheets are pressurized, non-pressurization regions Sd as pressurization intermediate regions occur on both sides besides the sheet width Sb of the A5 width. At this time, stress concentrates on both sides (the points Y2 and Y2') of the sheet width Sb. Consequently, the pressurization plate 169 bends about the center position Yc in the Y-direction, and the minimum value GBmin of the surface pressure near the center position Yc is low and falls below the reference surface pressure Gtgt. The pressurization force distribution of the A4-size sheets is uniform, and the minimum value GBmin of the surface pressure exceeds the reference surface pressure Gtgt.

Figure 15E:
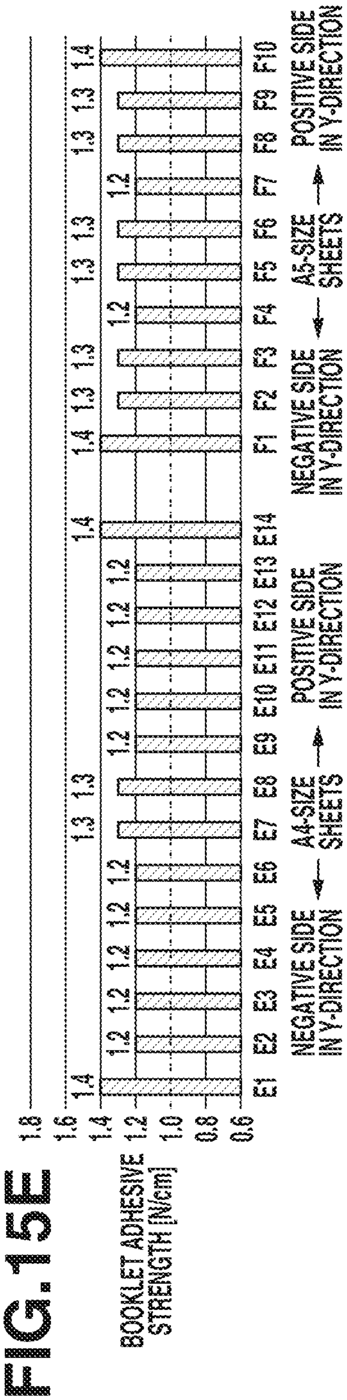
Figure 15F:
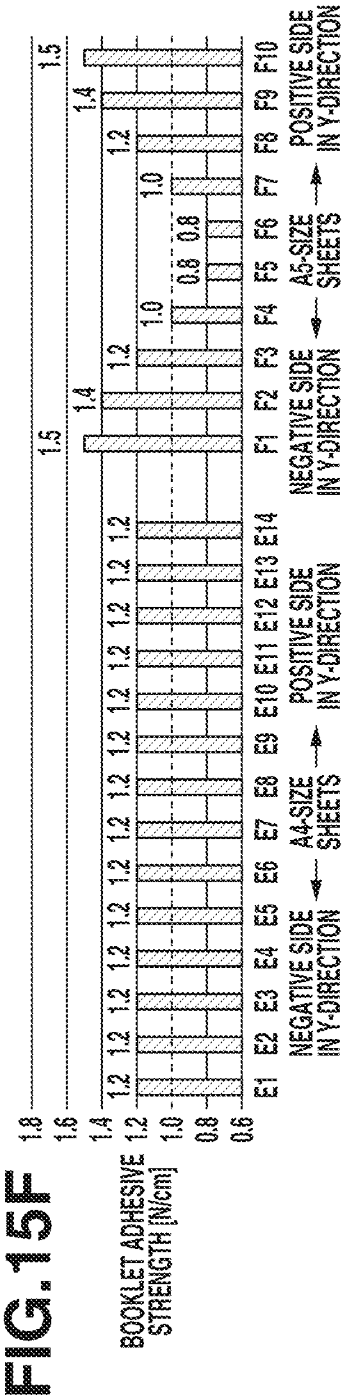

FIG. 15F illustrates the test result of the booklet adhesive strength in a case where the heating pressurization unit 167 according to comparative example 3 is used. The A4-size sheets obtain an excellent adhesive force in the test pieces E1 to E14. The A5-size sheets fall below the reference adhesive strength of 1.0 N/cm in the test pieces F5 and F6 corresponding to the center position Yc in the Y-direction of the heating pressurization unit 167. This is because, as described above, a member (a heating plate, the heater supporting body 603, or the metal stay 170) bends at the center position Yc in the Y-direction of the heating pressurization unit 167, and the minimum value GBmin of the surface pressure falls below the reference surface pressure Gtgt under the influence of this. FIG. 15E illustrates the test result of the booklet adhesive strength in a case where the heating pressurization unit 167 according to the third embodiment is used. In the A5-size sheets, a relationship where the thickness of the reception plate supporting portion 182*b* is $H_{Y2}<H_{Yc}$ and $HY_{2'}<H_{Yc}$ is set, whereby it is possible to increase the pressurization force to the center position Yc. Thus, an excellent adhesive force is obtained in the test pieces F1 to F10. In the A4-size sheets, a relationship where the thickness of the reception plate supporting portion 182*b* is $H_{Y1}>H_{Y2}$ and $HY_c>HY_{2'}$ is set, whereby it is possible to increase the pressurization forces to the end portions Y1 and Y3 of the sheet width Sa of the A4 width. Thus, an excellent adhesive force is obtained in the test pieces E1 to E14. Table 2 illustrates a list of the results of the comparative verification of the present embodiment and comparative example 3. The measurement results of "(M) pressurization force distribution" and the measurement results of "(N) booklet adhesive force" illustrated in table 2 are obtained by aggregating the contents and the verification results described above with reference to FIGS. 15E and 15F, FIGS. 18A to 18C, and FIGS. 19A to 19C. Table 2 is described below.

TABLE 2

Results of Comparative Verification of Third Embodiment and Comparative Example 3

| | (J2) Present Embodiment (L-J3) Slopes present $H_{Y1}>H_{Y2}$, $H_{Y3}>H_{Y2}$ $H_{Yc}>H_{Y2}$, $H_{Yc}>H_{Y2}$ | | (H3) Comparative Example 3 (L-H3) Slope absent $H_{Y1}=H_{Y2}=H_{Y3}$ | |
|---|---|---|---|---|
| | When A4 sheets are pressurized | When A5 sheets are pressurized | When A4 sheets are pressurized | When A5 sheets are pressurized |
| (M) Pressurization Force Distribution | (M-J3-1) Pressurization force: pass | (M-J3-2) Pressurization force: pass | (M-H3-1) Pressurization force: pass | (M-H3-2) Pressurization force: fail |

TABLE 2-continued

Results of Comparative Verification of Third Embodiment and Comparative Example 3

| | (J2) Present Embodiment (L-J3) Slopes present $H_{Y1} > H_{Y2}$, $H_{Y3} > H_{Y2}$ $H_{Yc} > H_{Y2}$, $H_{Yc} > H_{Y2}$ | | (H3) Comparative Example 3 (L-H3) Slope absent $H_{Y1} = H_{Y2} = H_{Y3}$ | |
|---|---|---|---|---|
| | When A4 sheets are pressurized | When A5 sheets are pressurized | When A4 sheets are pressurized | When A5 sheets are pressurized |
| Reference Value: 0.4 MPa | 0.50-0.60 MPa | 0.60-0.70 MPa | 0.55 MPa | 0.30-0.75 MPa |
| (N) Booklet Adhesive Force Reference Value: 1.0 N/cm | (N-J3-1) Adhesive force: pass 1.2-1.4 N/cm | (N-J3-2) Adhesive force: pass 1.2-1.4 N/cm | (N-H3-1) Adhesive force: pass 1.2 N/cm | (N-H3-2) Adhesive force: fail 0.8-1.5 N/cm |

(L) Shape of Reception Plate Supporting Portion

In the present embodiment, the thickness ($H_{Y1}$, $H_{Y2}$, $HY_c$, $HY_{2'}$, and $HY_3$) of the reception plate supporting portion 182b has a feature (FIG. 18B). The thicknesses corresponding to the end portion points of the sheet width Sa of the A4-size sheets are $H_{Y1}$ and $H_{Y3}$, the thicknesses corresponding to the end portion points of the sheet width Sb of the A5-size sheets are $H_{Y2}$ and $H_{Y2'}$, and the thickness corresponding to the center position Yc in the Y-direction of the heating pressurization unit 167 is $H_{Yc}$. A configuration is employed in which the shape of the reception plate supporting portion (L-J3) according to the present embodiment has slopes on both sides in the Y-direction with the end portions $H_{Y2}$ and $HY_{2'}$ in the pressurization region of the A5-size sheets as the starting points ($H_{Y1} > H_{Y2}$, $HY_3 > H_{Y2}$, $HY_c > H_{Y2}$, $HY_c > H_{Y2'}$). On the other hand, a configuration is employed in which the shape of the reception plate supporting portion (L-H3) according to comparative example 3 does not have a slope based on the thickness of the reception plate supporting portion 182b ($H_{Y1} = H_{Y2} = H_{Y3}$).

(M) Pressurization Force Distribution of Heating Pressurization Unit

In the present embodiment, both in the A4-size sheets and the A5-size sheets, the pressurization force can be maintained to be greater than or equal to the reference value (0.4 MPa) (M-J3-1 and M-J3-2). On the other hand, according to comparative example 3, a portion where the pressurization force falls below the reference value (0.4 MPa) occurs (M-H3-2).

(N) Booklet Adhesive Strength

In the present embodiment, both in the A4-size sheets and the A5-size sheets, the booklet adhesive force can be greater than or equal to the reference value (1.0 N/cm) (N-J3-1 and N-J3-2). On the other hand, according to comparative example 3, a portion where the booklet adhesive force falls below the reference value (1.0 N/cm) occurs (N-H3-2). As described above, by the method according to the present embodiment, even in a case where the heating pressurization unit 167 has a sheet reference position in a center portion, it is possible to appropriately adjust the pressurization force distribution.

[Supplementary Notes]

The above embodiments at least disclose the following booklet production apparatus and the following image forming system.

(Item 1)

A booklet production apparatus including:

an elongate heating pressurization unit configured to, in a state where a plurality of sheets in which adhesive layers are formed is piled up, heat and pressurize the adhesive layers, the heating pressurization unit including a pressurization plate configured to come into contact with the sheets and pressurize the sheets, a heating member configured to heat the pressurization plate, a reception member opposed to the pressurization plate, and a pressurization mechanism configured to apply a pressure to the sheets nipped between the pressurization plate and the reception member, wherein the booklet production apparatus is configured to produce a booklet by, while nipping the plurality of sheets in which the adhesive layers are formed between the pressurization plate and the reception member, heating and pressurizing the adhesive layer formed in the sheets, and wherein in a case where a region of the heating pressurization unit in a longitudinal direction of the heating pressurization unit where the heating pressurization unit heats and pressurizes a sheet of a maximum size is a first region, and a region of the heating pressurization unit in the longitudinal direction where the heating pressurization unit heats and pressurizes a sheet of a minimum size is a second region, and a region of the heating pressurization unit inside the first region and outside the second region in the longitudinal direction is a third region, the heating pressurization unit heats and pressurizes the sheet of the maximum size with a pressurization force profile having a minimum value in the longitudinal direction at a position in the third region or a position of an end portion of the second region adjacent to the third region, and a region where the pressure greater than the minimum value is applied is present in the third region and on a side opposite to a side where the second region is present with respect to the position of the minimum value in the longitudinal direction.

(Item 2)

The booklet production apparatus according to item 1, wherein the reception member includes a reception plate having elasticity and configured to nip a sheet together with the pressurization plate, and a reception plate supporting body including a reception plate supporting portion configured to support the reception plate.

(Item 3)

The booklet production apparatus according to item 2, wherein the pressurization force profile is achieved by variation in the longitudinal direction of a thickness in a sheet pressurization direction of at least one of the pressurization plate, the reception plate supporting portion or the reception plate.

(Item 4)

The booklet production apparatus according to item 3, wherein a thickness of at least one of the pressurization plate, the reception plate supporting body or the reception plate in the sheet pressurization direction is smallest at the position in the third region or the position of the end portion of the second region adjacent to the third region in the longitudinal direction.

(Item 5)

The booklet production apparatus according to item 4, wherein on a side opposite to a side where the second region is present with respect to a position where the thickness is smallest in the longitudinal direction, a region where the thickness is greater than the thickness of the pressurization plate, the reception plate supporting body or the reception plate in the sheet pressurization direction at the position where the thickness is smallest is present.

(Item 6)

The booklet production apparatus according to any one of the preceding items, wherein the heating pressurization unit has a reference position for aligning a sheet, and wherein the pressurization force profile has a pressure at the reference position that is higher than a pressure at the position of the end portion of the second region adjacent to the third region in the longitudinal direction.

(Item 7)

The booklet production apparatus according to item 6, wherein the reference position is at one end in the longitudinal direction.

(Item 8)

The booklet production apparatus according to item 6, wherein the reference position is in a center portion in the longitudinal direction and wherein the pressurization force profile has a pressure at the reference position that is higher than a pressure at the position of the end portion of the second region adjacent to the third region in the longitudinal direction on both sides of the reference position.

(Item 9)

An image forming system including:

the booklet production apparatus according to any one of the preceding claims; and an image forming apparatus configured to form an adhesive layer in a sheet.

It is possible to provide a booklet production apparatus and an image forming system that, regarding a plurality of sheet sizes, make the pressurization force distribution of a pressurization force applied to sheets in the longitudinal direction of a heating pressurization unit appropriate.

While the present invention has been described with reference to embodiments, it is to be understood that the invention is not limited to the disclosed embodiments but is defined by the scope of the following claims.

This application claims the benefit of Japanese Patent Application No. 2023-175757, filed Oct. 11, 2023, which is hereby incorporated by reference herein in its entirety.

What is claimed is:

1. A booklet production apparatus comprising:

An elongate heating pressurization unit configured to, in a state where a plurality of sheets in which adhesive layers are formed is piled up, heat and pressurize the adhesive layers, the heating pressurization unit including a pressurization plate configured to come into contact with the sheets and pressurize the sheets, a heating member configured to heat the pressurization plate, a reception member opposed to the pressurization plate, and a pressurization mechanism configured to apply a pressure to the sheets nipped between the pressurization plate and the reception member, wherein the booklet production apparatus is configured to produce a booklet by, while nipping the plurality of sheets in which the adhesive layers are formed between the pressurization plate and the reception member, heating and pressurizing the adhesive layer formed in the sheets, and wherein in a case where a region of the heating pressurization unit in a longitudinal direction of the heating pressurization unit where the heating pressurization unit heats and pressurizes a sheet of a maximum size is a first region, and a region of the heating pressurization unit in the longitudinal direction where the heating pressurization unit heats and pressurizes a sheet of a minimum size is a second region, and a region of the heating pressurization unit inside the first region and outside the second region in the longitudinal direction is a third region, the heating pressurization unit heats and pressurizes the sheet of the maximum size with a pressurization force profile having a minimum value in the longitudinal direction at a position in the third region or a position of an end portion of the second region adjacent to the third region, and a region where the pressure greater than the minimum value is applied is present in the third region and on a side opposite to a side where the second region is present with respect to the position of the minimum value in the longitudinal direction.

2. The booklet production apparatus according to claim 1, wherein the reception member includes a reception plate having elasticity and configured to nip a sheet together with the pressurization plate, and a reception plate supporting body including a reception plate supporting portion configured to support the reception plate.

3. The booklet production apparatus according to claim 2, wherein the pressurization force profile is achieved by variation in the longitudinal direction of a thickness in a sheet pressurization direction of at least one of the pressurization plate, the reception plate supporting portion or the reception plate.

4. The booklet production apparatus according to claim 3, wherein a thickness of at least one of the pressurization plate, the reception plate supporting body or the reception plate in the sheet pressurization direction is smallest at the position in the third region or the position of the end portion of the second region adjacent to the third region in the longitudinal direction.

5. The booklet production apparatus according to claim 4, wherein on a side opposite to a side where the second region is present with respect to a position where the thickness is smallest in the longitudinal direction, a region where the thickness is greater than the thickness of the pressurization plate, the reception plate supporting body or the reception plate in the sheet pressurization direction at the position where the thickness is smallest is present.

6. The booklet production apparatus according to claim 1, wherein the heating pressurization unit has a reference position for aligning a sheet, and wherein the pressurization force profile has a pressure at the reference position that is higher than a pressure at the position of the end portion of the second region adjacent to the third region in the longitudinal direction.

7. The booklet production apparatus according to claim 6, wherein the reference position is at one end in the longitudinal direction.

8. The booklet production apparatus according to claim 6, wherein the reference position is in a center portion in the longitudinal direction and wherein the pressurization force profile has a pressure at the reference position that is higher than a pressure at the position of the end portion of the second region adjacent to the third region in the longitudinal direction on both sides of the reference position.

9. An image forming system comprising:

the booklet production apparatus according to claim 1; and an image forming apparatus configured to form an adhesive layer in a sheet.

* * * * *